United States Patent
Fuchs et al.

(10) Patent No.: US 11,428,157 B2
(45) Date of Patent: Aug. 30, 2022

(54) ENHANCED AERO DIESEL ENGINE

(71) Applicant: General Atomics Aeronautical Systems, Inc., San Diego, CA (US)

(72) Inventors: Michael J. Fuchs, New Richmond, WI (US); Steven M. Weinzierl, New Richmond, WI (US); Oliver Schneider, Bonn (DE); Markus Evers, Leverkusen (DE)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 13 days.

(21) Appl. No.: 16/632,783

(22) PCT Filed: Jul. 20, 2018

(86) PCT No.: PCT/US2018/043081
§ 371 (c)(1),
(2) Date: Jan. 21, 2020

(87) PCT Pub. No.: WO2019/018761
PCT Pub. Date: Jan. 24, 2019

(65) Prior Publication Data
US 2020/0158015 A1    May 21, 2020

Related U.S. Application Data

(60) Provisional application No. 62/535,459, filed on Jul. 21, 2017.

(51) Int. Cl.
*F02B 75/24*    (2006.01)
*B01D 45/12*    (2006.01)
(Continued)

(52) U.S. Cl.
CPC ........... *F02B 75/243* (2013.01); *B01D 45/12* (2013.01); *F01M 13/04* (2013.01); *F01P 3/02* (2013.01);
(Continued)

(58) Field of Classification Search
CPC .............................. F02B 75/243; F02B 61/04; F02B 2075/1832; F02B 75/24; B01D 45/12;
(Continued)

(56) References Cited

U.S. PATENT DOCUMENTS

| | | | |
|---|---|---|---|
| 1,405,093 A | 1/1922 | Beecher | |
| 2,076,892 A | 4/1937 | Irgens | |

(Continued)

FOREIGN PATENT DOCUMENTS

| | | | |
|---|---|---|---|
| CN | 2835598 Y | 11/2006 | |
| CN | 1977099 | 6/2007 | |

(Continued)

OTHER PUBLICATIONS

International Search Report and Written Opinion for PCT/US2018/043081 dated Oct. 30, 2018.
(Continued)

*Primary Examiner* — Yi-Kai Wang
(74) *Attorney, Agent, or Firm* — Knobbe Martens Olson & Bear LLP

(57) ABSTRACT

A ferritic aero diesel engine. The ferritic aero diesel engine includes an iron crankcase, a steel crankshaft and eight steel piston assemblies. The iron crankcase has a flat, horizontally opposed eight cylinder arrangement with a first set of cylinder walls defining a first set of cylinders in a first bank and a second set of cylinder walls defining a second set of cylinders in an opposed second bank. The steel crankshaft is rotatably mounted at least partially within the iron crankcase. Each of the steel piston assemblies of the plurality of
(Continued)

steel piston assemblies is received within a respective cylinder of the iron crankcase and is coupled to the steel crankshaft. The first and second sets of cylinder walls have a minimum wall thickness of between approximately 4.8 and 5.2 mm.

17 Claims, 21 Drawing Sheets

(51) Int. Cl.
| | | |
|---|---|---|
| *F01M 13/04* | (2006.01) | |
| *F01P 3/02* | (2006.01) | |
| *F01P 3/18* | (2006.01) | |
| *F01P 7/14* | (2006.01) | |
| *F02B 61/04* | (2006.01) | |
| *F02F 1/14* | (2006.01) | |
| *F02F 1/24* | (2006.01) | |
| *F02F 7/00* | (2006.01) | |
| *F01P 7/16* | (2006.01) | |
| *F02F 1/10* | (2006.01) | |
| *F02B 75/18* | (2006.01) | |

(52) U.S. Cl.
CPC .................. *F01P 3/18* (2013.01); *F01P 7/14* (2013.01); *F01P 7/16* (2013.01); *F02B 61/04* (2013.01); *F02B 75/24* (2013.01); *F02F 1/10* (2013.01); *F02F 1/14* (2013.01); *F02F 1/24* (2013.01); *F02F 7/0009* (2013.01); *F02F 7/0053* (2013.01); *F02F 7/0085* (2013.01); *F01M 2013/0422* (2013.01); *F01P 2003/021* (2013.01); *F01P 2007/146* (2013.01); *F01P 2025/31* (2013.01); *F01P 2025/32* (2013.01); *F01P 2050/20* (2013.01); *F02B 2075/1832* (2013.01)

(58) Field of Classification Search
CPC ... F01M 13/04; F01M 2013/0422; F01P 3/02; F01P 3/18; F01P 7/14; F01P 2003/021; F01P 2007/146; F01P 2025/31; F01P 2003/028; F01P 2025/32; F01P 2050/20; F01P 7/16; F02F 1/14; F02F 1/24; F02F 7/0009; F02F 7/0053; F02F 7/0085; F02F 7/0007; F02F 1/10
USPC .......................................................... 123/41.1
See application file for complete search history.

(56) References Cited

U.S. PATENT DOCUMENTS

| | | |
|---|---|---|
| 2,287,224 A | 6/1942 | Barkeij |
| 2,610,616 A | 9/1952 | Woodruff et al. |
| 2,618,250 A | 11/1952 | Stewart |
| 2,764,961 A | 10/1956 | Rothwell |
| 2,852,837 A | 9/1958 | Fageol |
| 3,027,706 A | 4/1962 | Sprick |
| 3,756,206 A | 9/1973 | Gommel |
| 4,159,700 A | 7/1979 | McCrum |
| 4,397,285 A | 8/1983 | O'Neill |
| 4,632,072 A | 12/1986 | Brogdon |
| 4,966,042 A | 10/1990 | Brown |
| 5,052,354 A | 10/1991 | Kindaichi |
| 5,327,863 A | 7/1994 | Downton et al. |
| 5,493,952 A | 2/1996 | Daniel et al. |
| 5,555,730 A | 9/1996 | Hope |
| 5,562,073 A | 10/1996 | Van Bezeij et al. |
| 5,604,441 A | 2/1997 | Freese et al. |
| 5,713,325 A | 2/1998 | Yoshida et al. |
| 5,720,254 A | 2/1998 | Yoshida et al. |
| 5,775,273 A | 7/1998 | Beale |
| 5,878,703 A | 3/1999 | Sweeney |
| 5,918,584 A | 7/1999 | Kato |
| 5,941,743 A | 8/1999 | Kato |
| 5,992,358 A | 11/1999 | Otome |
| 6,019,074 A | 2/2000 | Otome |
| 6,035,637 A | 3/2000 | Beale et al. |
| 6,073,595 A | 6/2000 | Brogdon |
| 6,138,504 A | 10/2000 | Lewis et al. |
| 6,192,852 B1 | 2/2001 | Gerhards et al. |
| 6,224,021 B1 | 5/2001 | Tanaka |
| 6,234,012 B1 | 5/2001 | Lewis et al. |
| 6,253,725 B1 | 7/2001 | Groddeck et al. |
| 6,279,519 B1 | 8/2001 | Nagel et al. |
| 6,340,289 B1 | 1/2002 | Vos et al. |
| 6,349,681 B1 | 2/2002 | Li |
| 6,405,708 B1 | 6/2002 | Watson |
| 6,564,767 B1 | 5/2003 | Reese |
| 6,647,944 B2 | 11/2003 | Kamiya |
| 6,820,597 B1 | 11/2004 | Cullen et al. |
| 7,174,879 B1 | 2/2007 | Choi et al. |
| 7,191,742 B2 | 3/2007 | Fuchs et al. |
| 7,509,936 B2 | 3/2009 | Weinzierl et al. |
| 9,181,868 B2 | 11/2015 | Weinzierl et al. |
| 9,447,729 B2 | 9/2016 | Weinzierl et al. |
| 9,611,790 B2 | 4/2017 | Weinzierl et al. |
| 10,598,119 B2 | 3/2020 | Weinzierl et al. |
| 2001/0015182 A1 | 8/2001 | Moorman et al. |
| 2001/0027771 A1 | 10/2001 | Kato |
| 2002/0023615 A1 | 2/2002 | Dreymuller et al. |
| 2002/0066445 A1 | 6/2002 | Thomas |
| 2003/0015166 A1 | 1/2003 | Seymour |
| 2003/0116113 A1* | 6/2003 | Ward ............... F02F 7/0085 164/58.1 |
| 2003/0167139 A1 | 9/2003 | Swartz et al. |
| 2003/0179966 A1* | 9/2003 | Hojo ............... F16C 33/046 384/288 |
| 2003/0221655 A1 | 12/2003 | Surnilla et al. |
| 2004/0237514 A1 | 12/2004 | Surnilla et al. |
| 2005/0022789 A1 | 2/2005 | Palma et al. |
| 2005/0039721 A1 | 2/2005 | Truscott et al. |
| 2005/0109293 A1 | 5/2005 | Matsuda et al. |
| 2005/0125140 A1 | 6/2005 | Vermonet et al. |
| 2005/0198957 A1 | 9/2005 | Kim |
| 2006/0213465 A1* | 9/2006 | Sunada ............... F02F 1/108 29/888.061 |
| 2007/0028867 A1 | 2/2007 | Fuchs et al. |
| 2007/0227492 A1 | 10/2007 | Cheiky |
| 2008/0006739 A1 | 1/2008 | Mochida et al. |
| 2008/0022963 A1 | 1/2008 | Weinzierl et al. |
| 2008/0078167 A1 | 4/2008 | Wang et al. |
| 2008/0147295 A1 | 6/2008 | Sivasubramaniam et al. |
| 2008/0243352 A1 | 10/2008 | Healy |
| 2008/0245613 A1 | 10/2008 | Rutschmann et al. |
| 2008/0276897 A1 | 11/2008 | Petridis et al. |
| 2009/0173821 A1 | 7/2009 | Bhargava |
| 2009/0205590 A1* | 8/2009 | Vetrovec ............... F28F 1/40 123/41.14 |
| 2009/0248278 A1 | 10/2009 | Nakasaka |
| 2009/0250020 A1* | 10/2009 | McKaig ............... F01B 3/04 123/559.1 |
| 2009/0266336 A1 | 10/2009 | Morimoto et al. |
| 2010/0024759 A1 | 2/2010 | Dobransky |
| 2010/0064689 A1 | 3/2010 | Reinhardt |
| 2010/0180576 A1 | 7/2010 | Wang et al. |
| 2010/0187180 A1* | 7/2010 | Baten ............... B01D 45/08 60/39.08 |
| 2010/0229809 A1 | 9/2010 | Braly |
| 2011/0030654 A1 | 2/2011 | Taylor |
| 2011/0106399 A1 | 5/2011 | Asano et al. |
| 2011/0139111 A1 | 6/2011 | Stephan |
| 2011/0180037 A1 | 7/2011 | Blom |
| 2011/0238283 A1 | 9/2011 | Miersch-Wiemers et al. |
| 2012/0085299 A1* | 4/2012 | Kuhlbach ............... F02F 1/40 123/41.72 |
| 2013/0112158 A1* | 5/2013 | Weinzierl ............... F02B 75/246 123/445 |
| 2013/0146017 A1* | 6/2013 | Muscas ............... F02F 3/26 123/193.6 |

(56) References Cited

U.S. PATENT DOCUMENTS

| | | | |
|---|---|---|---|
| 2013/0291550 A1 | 11/2013 | Weinzierl et al. | |
| 2014/0069371 A1 | 3/2014 | Berkemeier et al. | |
| 2014/0278007 A1 | 9/2014 | Wilcutts et al. | |
| 2016/0146150 A1 | 5/2016 | Song et al. | |
| 2016/0319771 A1* | 11/2016 | Lavazza | F02F 7/00 |
| 2017/0030249 A1* | 2/2017 | Maki | F02F 1/004 |
| 2017/0145945 A1 | 5/2017 | Weinzierl et al. | |
| 2017/0211507 A1* | 7/2017 | Qin | C22C 37/04 |
| 2017/0356316 A1* | 12/2017 | Suzuki | B01D 45/06 |
| 2018/0202513 A1 | 7/2018 | Nardella | |
| 2018/0258878 A1* | 9/2018 | Maki | F02F 1/004 |
| 2019/0120117 A1 | 4/2019 | Doers et al. | |
| 2020/0040980 A1* | 2/2020 | Steven | F16H 48/40 |
| 2020/0392920 A1 | 12/2020 | Weinzierl et al. | |

FOREIGN PATENT DOCUMENTS

| | | |
|---|---|---|
| CN | 101180458 | 5/2008 |
| CN | 201057121 | 5/2008 |
| CN | 102052183 | 5/2011 |
| CN | 102200066 | 9/2011 |
| CN | 103993958 A | 8/2014 |
| CN | 104145104 A | 11/2014 |
| CN | 105781772 A | 7/2016 |
| DE | 3417349 | 11/1985 |
| DE | 10-2004-052703 | 6/2005 |
| DE | 10-2005-001585 | 8/2006 |
| DE | 10-2009-010746 | 7/2010 |
| EP | 1777398 | 4/2007 |
| GB | 2468872 | 9/2010 |
| JP | H06-50158 | 2/1994 |
| JP | 2006-161657 | 6/2006 |
| JP | 2007-224743 | 9/2007 |
| KR | 10-2010-0100340 | 9/2010 |
| RU | 2010153310 | 7/2012 |
| RU | 2014-118576 | 11/2015 |
| WO | WO 1986/01562 | 3/1986 |
| WO | WO 1999/31371 | 6/1999 |
| WO | WO 1999/51868 | 10/1999 |
| WO | WO 2005/124132 | 12/2005 |

OTHER PUBLICATIONS

International Search Report for PCT/US07/16095, dated Sep. 10, 2008, in 3 pages.
Office Action dated Jan. 9, 2019, for Chinese Application No. 201280060010.3, in 7 pages.
Office Action dated Oct. 11, 2017, for Chinese Application No. 201280060010.3, in 7 pages.
Office Action dated Feb. 22, 2019, for Indian Application No. 741/MUMNP/2014, in 7 pages.
Office Action dated Sep. 13, 2018, for Canadian Application No. 2,853,748, in 3 pages.
Office Action dated Apr. 1, 2017, for Chinese Application No. 201280060010.3, in 8 pages.
Office Action dated Jun. 2, 2016, for Russian Application No. 2014117700/06, in 9 pages.
Office Action dated Dec. 2, 2015, for Chinese Application No. 201280060010.3, in 10 pages.
EP Communication and Supplementary European Search Report for Application No. EP 12838031.8, dated May 19, 2015, in 5 pages.
Communication dated Nov. 23, 2018, in EP Application No. 12838031.8, in 4 pages.
International Search Report and Written Opinion for Application No. PCT/US2012/059121, dated Apr. 19, 2013, in 9 pages.
International Search Report and Written Opinion for Application No. PCT/US2012/059946, dated Mar. 29, 2013, in 10 pages.
Extended European Search Report for EP Application No. 12839362.6, dated Oct. 30, 2015, in 5 pages.
Decision on Grant for Russian Application No. 201411700, dated Dec. 30, 2016, in 12 pages.
Office Action listed in Chinese Application No. 201880060888.4 dated Jun. 2, 2021 in 12 pages.
"Engineered Propulsion Systems Graflight V-8", Wikipedia, retrieved from the internet https://en.wikipedia.org/wiki/Engineered_Propulsion_Systems_Graflight_V-8.
Moore, "Rutan flies new diesel—AOPA", retrieved May 15, 2014 from the internet, https://www.aopa.org/news-and-media/all-news/2014/May 15/rutan-flies-new-diesel.
Orlin et al., "Internal combustion engines—design and operation of piston and combined engines", Mechanical Engineering, pp. 70-87, (1990).
Supplementary European Search Report for European Application No. 18835228, dated Apr. 30, 2021, in 2 pages.
Office Action with English translation for Russian Application No. 2020107663, dated Oct. 19, 2021, in 4 pages.
Examination Report in Australian Application No. 2012318370, dated Mar. 21, 2016, in 3 pages.
Office Action in Brazilian Application No. BR 112014008308-8, dated Oct. 5, 2012, in 6 pages (with English translation).
Office Action in Australian Application No. 2012322066, dated Jun. 3, 2016, in 3 pages.
Office Action in Canadian Application No. 2,854,230, dated Jul. 29, 2019, in 3 pages.
Office Action in Canadian Application No. 2,854,230, dated Nov. 22, 2018, in 5 pages.
Office Action in Chinese Application No. 201280061293.3, dated May 12, 2017, in 5 pages.
Office Action in Chinese Application No. 201280061293.3, dated Dec. 16, 2015, in 7 pages.
Decision on Grant in Russian Application No. 2014118576/06, dated Mar. 31, 2017, in 13 pages.
Decision on Rejection in Indian Application No. 202017007206, dated Feb. 15, 2022, in 7 pages.

* cited by examiner

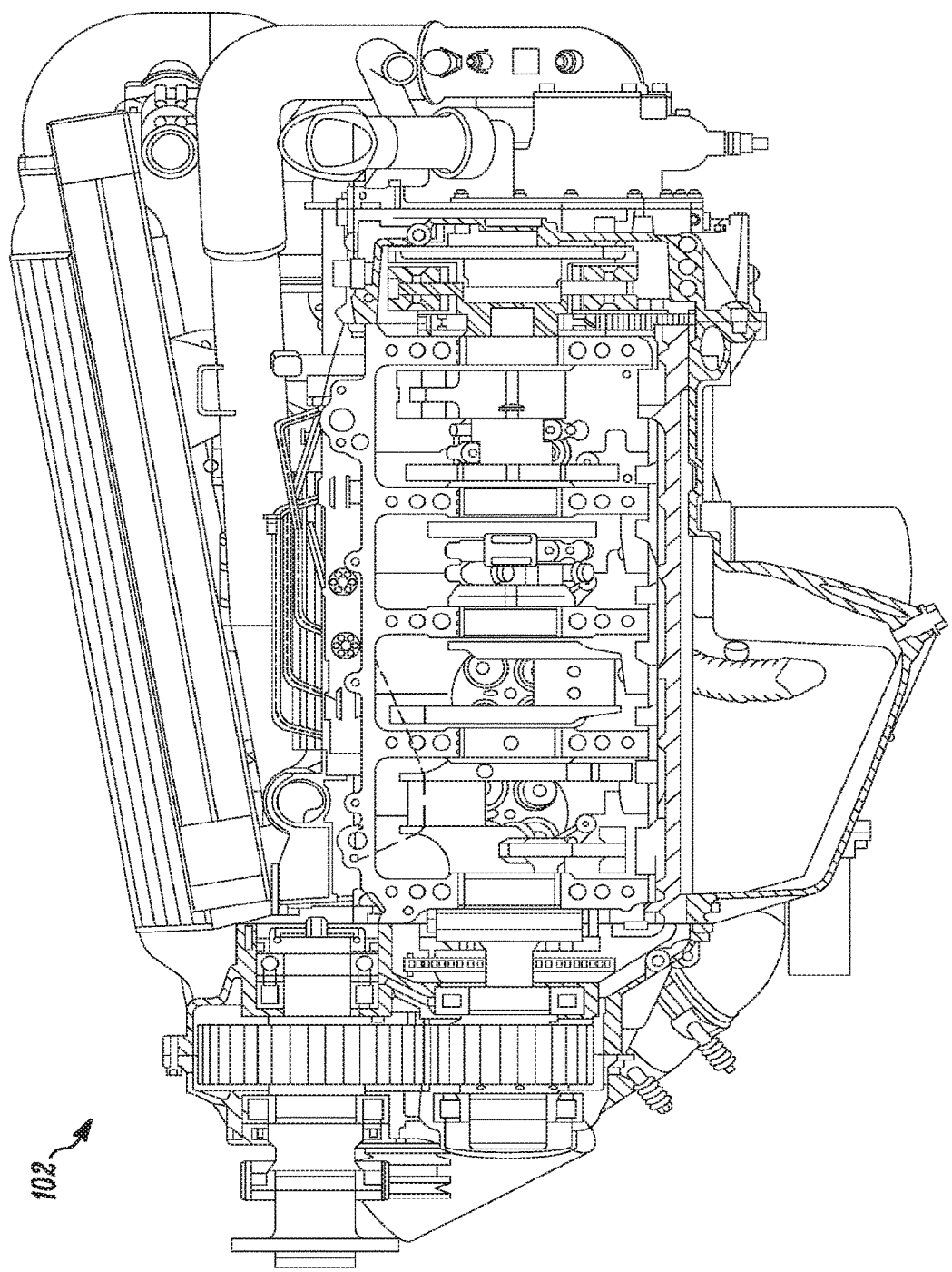
FIG. 2A (SECTION A-A)

(SECTION B-B)

(SECTION D-D)

(SECTION E-E)

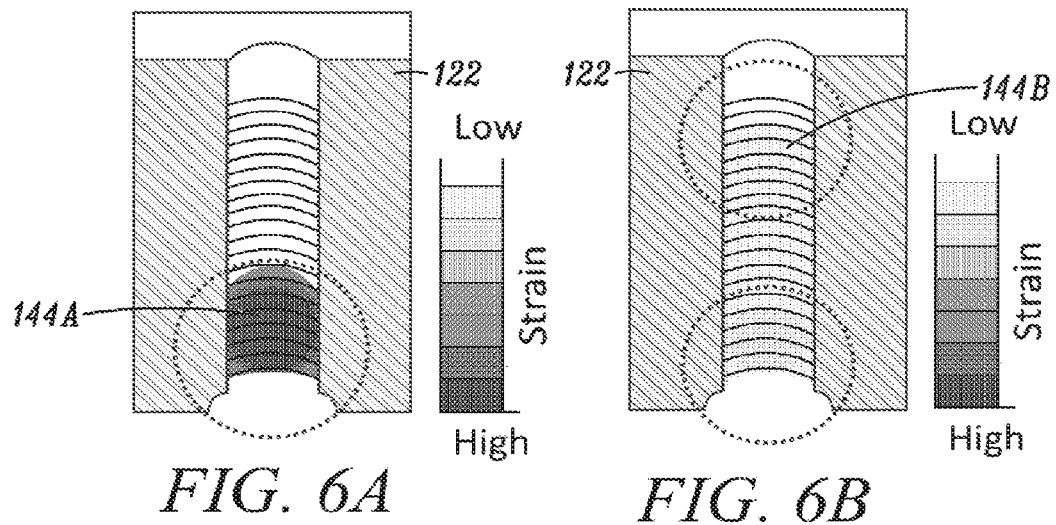
FIG. 6A   FIG. 6B
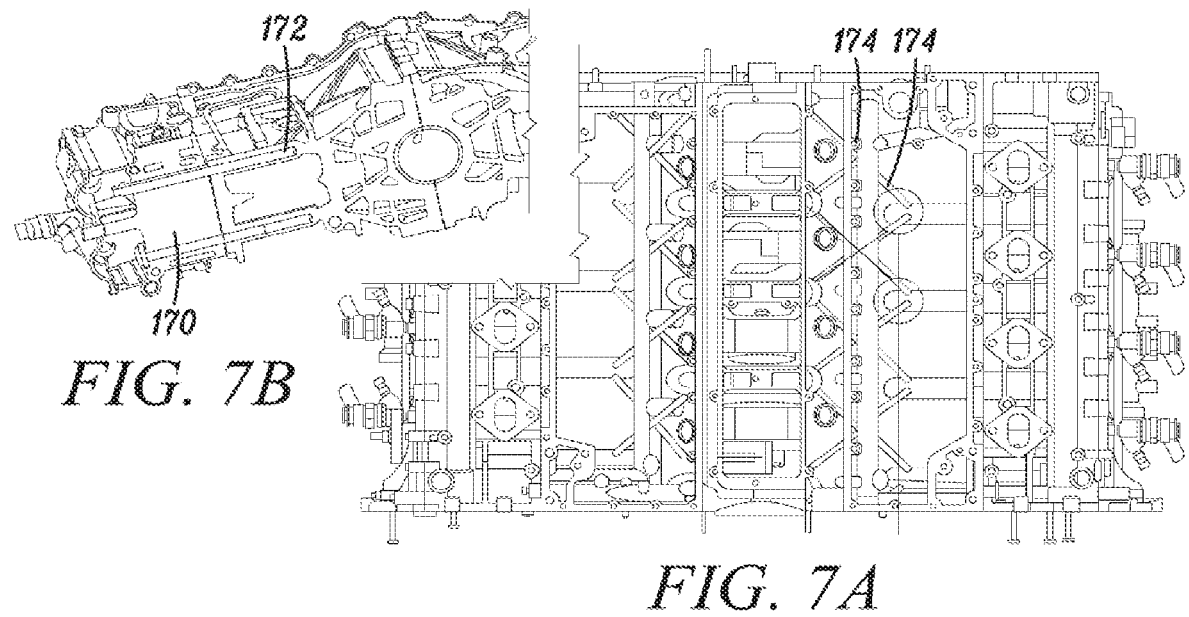
FIG. 7B
FIG. 7A

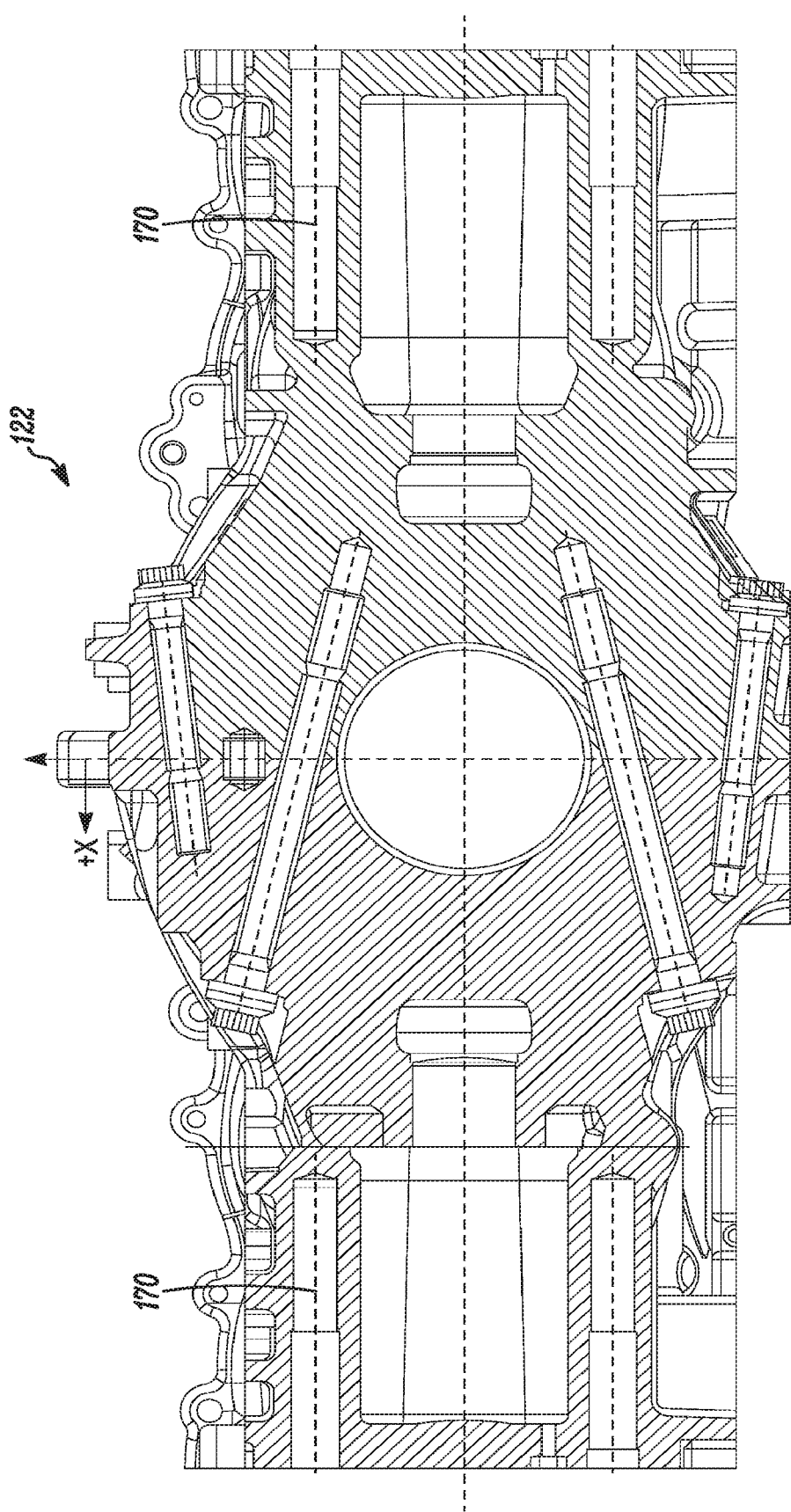

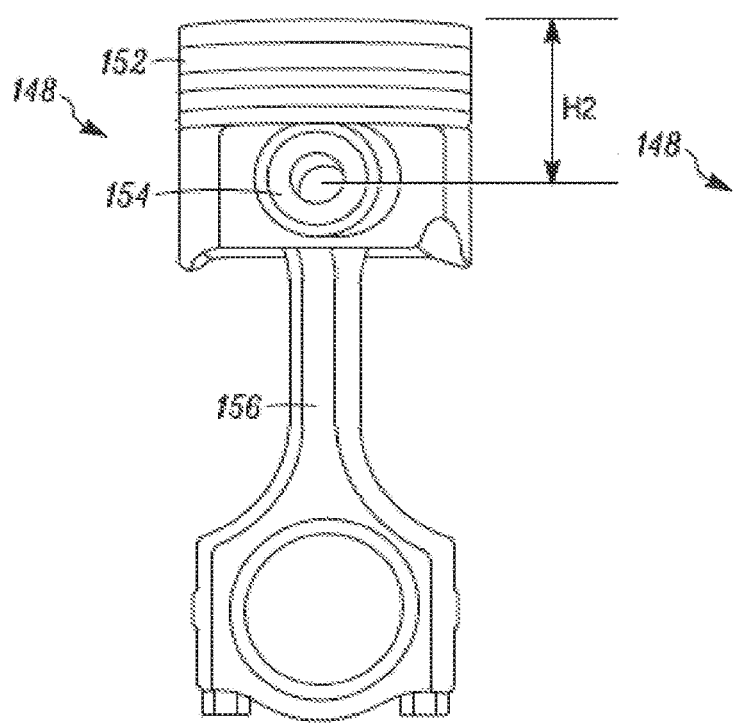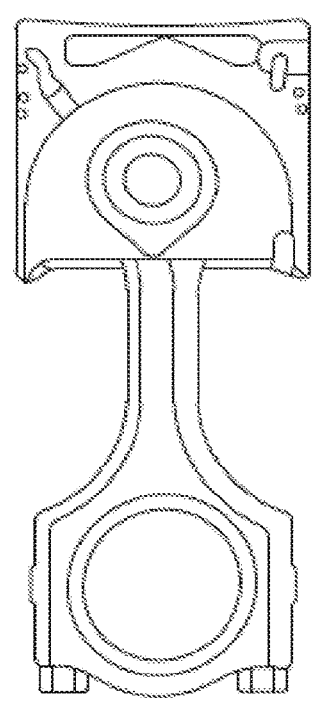
FIG. 9　　　FIG. 9A (PRIOR ART)
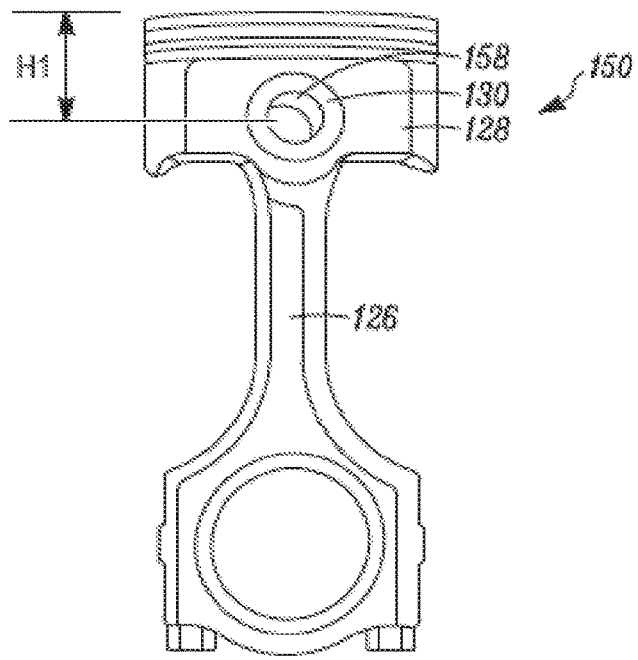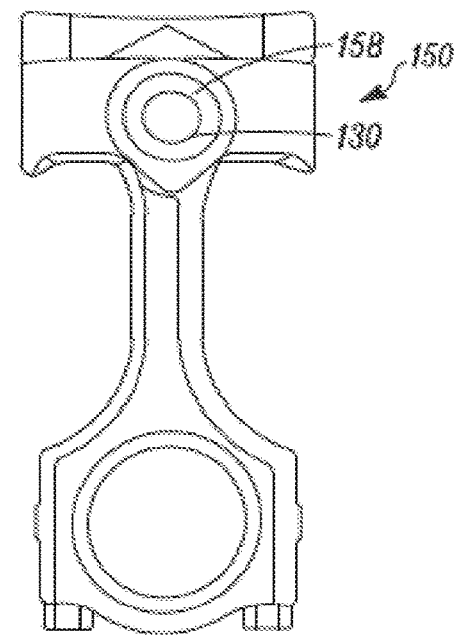
FIG. 10　　　FIG. 10A

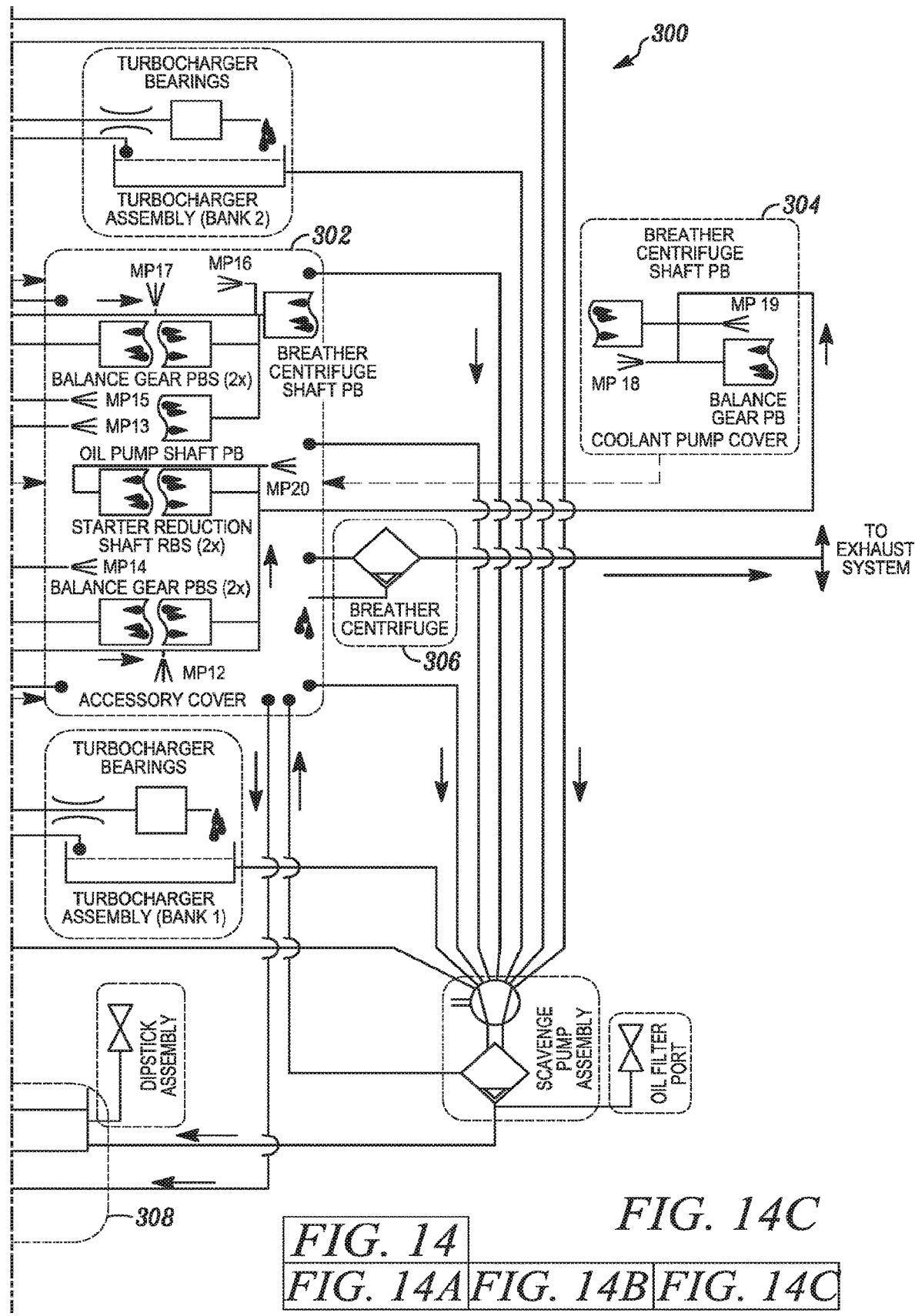

ENHANCED AERO DIESEL ENGINE

RELATED APPLICATION INFORMATION

This application is a U.S. National Stage entry of PCT Application No. PCT/US2018/043081 filed Jul. 20, 2018 which claims the benefit of U.S. Provisional Application No. 62/535,459 filed Jul. 21, 2017, the contents of which are fully incorporated herein by reference.

TECHNICAL FIELD

The present disclosure relates generally to aero diesel engines. More particularly, the present disclosure relates to lightweight, ferritic aero diesel engines configured to improve reliability and minimize oil loss and/or consumption during extended flight.

BACKGROUND

Although fuel economy is an important factor in maximizing the range (distance) and duration (flight time) in aviation, an equally important and frequently overlooked factor is lubrication oil economy. In some cases, a high rate of oil loss and/or consumption can be the limiting factor in an aircraft's range and duration. Increasing the initial amount of lubricating oil to compensate for a high rate of oil loss can present weight and balance issues. Moreover, the added weight from the extra oil can have an adverse impact on fuel economy. Accordingly, engines with low oil consumption have the advantage of greater range and duration.

Another factor which can significantly limit an aircraft's range and distance is its reliability. Regardless of the fuel economy, a mechanical problem experienced during flight will have an adverse effect on the aircraft's capabilities. In some cases, the flight must be curtailed and/or the mission must be canceled in order to land safely. In severe cases, the mechanical problem can lead to damage of the aircraft and/or loss of life.

One type of mechanical problem common to lightweight, high power aircraft engines is fatigue cracking over a period of extended use. For weight reasons, nearly all modern diesel compression-combustion aircraft engines are constructed of aluminum alloys. Aluminum has proven to be a lightweight, cost-effective, corrosion resistant material well-suited to aircraft engines. However, the usable life of engine components constructed of aluminum is limited by its continuous degradation (leading to fatigue cracking) when subjected to stress. Given the high stress present in the compression-combustion process, fractures within the components will eventually begin to develop, necessitating their replacement. This is particularly prevalent in threaded bores within the engine crankcase. If such fractures remain unnoticed, a catastrophic failure can occur during flight causing engine degradation or a sudden loss of power.

Another problem known to aero diesel engines is "freezing of combustion" at low power loads, often during long descents. Unmanned Aerial Vehicles (UAVs) are particularly prone to this phenomenon due to their high glide ratios. During descent, engine power may be throttled back, potentially to idle. As the aircraft approaches its desired level off altitude, the pilot attempts to increase the engine power, only to find that the engine is unresponsive. The aircraft is then forced to continue to descend, which can result in destruction of the aircraft.

It is believed that this phenomenon can occur as a result of rapid cooling during descent. During descent, the engine is often throttled back to a low-power setting, such that the engine is developing much less heat than when operating at a higher power setting. Simultaneously, the aircraft's speed may increase during descent, which can increase the cooling effect. Given that diesel engines rely solely on a combination of retained cylinder heat and compression for combustion, the rapid decrease in cylinder temperature can adversely affect combustion. This can further be exacerbated by fuel which has been super-cooled during high altitude flight.

A similar phenomenon can occur when attempting to restart an engine at a high altitude. During starting, glow plugs are used to preheat the incoming charge until the cylinder reaches a temperature sufficient to maintain combustion. In many cases, the engine may include a turbocharger to compress the air prior to entering the cylinder. Upon mixing with the fuel, the air-fuel charge is then compressed by the piston to affect ignition.

With the low density, super-cooled air common at high altitudes, even when using glow plugs, it can be a challenge to achieve the level of heat necessary to initiate combustion. A turbocharger that has spooled down or stopped, and is no longer compressing the air entering the cylinder can further complicate the matter. In some cases, the aircraft may be required to descend to higher density, warmer air before a restart is possible. In some conditions, such as when flying in mountainous terrain or in the presence of antiaircraft weaponry, such a descent is not possible.

Accordingly, what is needed in the industry is a lightweight, high power aircraft engine designed to minimize the consumption and/or loss of lubricating oil during flight. Further, what is needed in the industry is an aircraft engine constructed in such a manner that it can endure high stress loads for a long period of time with minimal degradation to structural components, and maintain a more consistent interior cylinder temperature, so as to avoid freezing of combustion during low-power descents and enable engine restarts at high-altitude. Applicants of the present disclosure have developed an aero diesel engine to address these concerns.

SUMMARY OF THE DISCLOSURE

Embodiments of the present disclosure provide an aero diesel engine constructed of ferritic material, such as steel, in which the consumption and/or loss of lubricating oil is minimized through a combination of a reduced piston-cylinder bore clearance and an integrated, multi-centrifuge dry sump lubrication system. Such ferritic aero diesel engines are less prone to experience fatigue stress fracturing in comparison to their aluminum counterparts. Moreover, embodiments of the present disclosure are also able to retain their interior cylinder temperature to a higher degree than their aluminum counterparts, thereby reducing the possibility of freezing of combustion during extended low-power descents, as well as enabling high-altitude restarts. Some embodiments of the present disclosure further include a water jacket at least partially surrounding the cylinders in which temperature regulated water can be circulated to further aid in controlling the cylinder temperature.

Recent advances in material science, Computer-Aided Engineering (CAE) analysis techniques, and sand core technology, including the ability to "print" high-quality sand cores of complex geometry, has enabled the casting of thin-walled iron structures with consistent material properties. Accordingly, Applicants of the present disclosure have developed a high strength, reliable engine capable of extreme performance, without the limitations and fatigue life that is inherent in aluminum structures. Moreover, the use of high-strength ferritic materials has enabled the Applicants to reduce both the weight and bulk (volume) of the engine, in comparison to an aluminum engine producing the equivalent amount of power.

One embodiment of the present disclosure provides a ferritic aero diesel engine including an iron crankcase, a steel crankshaft, and a plurality of steel piston assemblies. The iron crankcase can have a flat, horizontally opposed multi-cylinder arrangement with a first set of cylinder walls defining a first set of cylinders in a first bank and a second set of cylinder walls defining a second set of cylinders in an opposed second bank. In one embodiment, there are four cylinders in the first bank and four cylinders in the second bank. The steel crankshaft can be rotatably mounted at least partially within the iron crankcase. Each steel piston assembly of the plurality of steel piston assemblies can be received within a respective cylinder of the iron crankcase, and can be coupled to the steel crankshaft. In one embodiment, the first and second set of cylinder walls can have a minimum wall thickness of between approximately 4.8 and 5.2 mm.

In one embodiment, the ferritic aero diesel engine with accessories can weigh between approximately 595-680 lbs. (without operating fluids). In one embodiment, the ferritic aero diesel engine can be configured to produce between approximately 300-450 hp. In one embodiment, the ferritic aero diesel engine can further comprise a first aluminum cylinder head and a second aluminum cylinder head, wherein the first aluminum cylinder head and second aluminum cylinder head are operably coupled to the iron crankcase via a plurality of head bolts terminating proximal to a bottom portion of the respective cylinders. In one embodiment, the crankcase can further include diagonal ribs configured to improve a structural integrity of the crankcase. In one embodiment, the ferritic aero diesel engine can further include one or more journal bearings, wherein the radial clearance of the one or more journal bearings is between approximately 35-55 μm. In one embodiment, the piston assemblies are configured to withstand an infinite number of stress cycles having a peak stress of 300 MPa or less. In one embodiment, the ferritic aero diesel engine is configured to operate with a peak cylinder pressure of up to 240 bar.

In one embodiment, the ferritic aero diesel engine further comprises a coolant system, wherein adjacent cylinders of the respective first bank of cylinders and the second bank of cylinders are spaced approximately 12 mm apart, and wherein the space between cylinder walls defines a water jacket between the adjacent cylinders through which engine coolant of the coolant system can be circulated. In one embodiment, the coolant system can further include a radiator and radiator bypass valve, wherein the radiator bypass valve can be configured to selectively isolate the radiator from the remainder of the coolant system. In one embodiment, the radiator bypass valve can be controlled via one or more temperature sensors configured to sense a temperature of the engine coolant surrounding the cylinders. In one embodiment, the radiator bypass valve can be activated when a temperature sensed by at least one of the one or more temperature sensors decreases below approximately 222° C.

In one embodiment, the ferritic aero diesel engine can further include an engine lubrication system having a first centrifuge mechanism configured to separate blow-by gases from lubricating oil, and a second centrifuge mechanism configured to further separate aerosolized lubricating oil from the blow-by gases.

In one embodiment, the ferritic aero diesel engine can further include at least one light weight gear having an outer rim and primary webbing constructed of a unitary member, such that together the outer rim and primary webbing form a dish like structure defining a hollow area devoid of material. In one embodiment, the at least one light weight gear can further include secondary webbing coupled to the outer rim opposed to the primary webbing, such that the hollow area is positioned between the primary webbing and the secondary webbing.

Another embodiment of the present disclosure provides a ferritic aero diesel engine configured to minimize oil loss during extended flight. The aero diesel engine can include an iron crankcase, steel crankshaft, a plurality of steel piston assemblies, and a lubrication oil circulation system. The iron crankcase can include a plurality of cylinder walls defining a respective plurality of cylinders. The steel crankshaft can be rotatably mounted at least partially within the iron crankcase. Each steel piston assembly of the plurality of steel piston assemblies can include a piston head received within a respective one of the plurality of cylinders, and a connecting rod operably coupled to the steel crankshaft. The lubrication oil circulation system can include a first centrifuge mechanism configured to separate lubricant from a flow of blow-by gas, and a second centrifuge mechanism configured to receive the flow of blow-by gas from the first centrifuge for further separation of lubricant from the flow of blow-by gas. In one embodiment, the radial clearance between each of the piston heads and the respective cylinder walls can be tuned to operate between approximately 60 and 150 μm.

In one embodiment, the ferritic aero diesel engine with accessories ways between approximately 595-680 lbs (without operating fluids). In one embodiment, the ferritic aero diesel engine is configured to produce between approximately 300-450 hp. In one embodiment, the ferritic aero diesel engine has a displacement of approximately 4.3 L. In one embodiment, first bank of cylinders and the second pickup cylinders are separated by an angle of approximately 180°. In one embodiment, the firing order of cylinders is 1-7-5-3-6-4-2-8. In one embodiment, the ferritic aero diesel engine further comprises a coolant system, wherein adjacent cylinders of the ferritic aero diesel engine are spaced approximately 12 mm apart, and wherein the space between cylinder walls defines a water jacket between the adjacent cylinders through which engine coolant of the coolant system can be circulated.

In one embodiment, the coolant system further includes a radiator and a radiator bypass valve, wherein the radiator bypass valve is configured to selectively isolate the radiator from the remainder of the coolant system. In one embodiment, the radiator bypass valve is controlled via one or more temperature sensors configured to sense a temperature of the engine coolant surrounding the cylinders. In one embodiment, the radiator bypass valve is activated when the temperature sensed by at least one of the one or more temperature sensors decreases below approximately 220° C.

Another embodiment of the present disclosure provides a ferritic aero diesel engine configured to improve combustion stability and restarting at high altitudes. The aero diesel engine can include an iron crankcase, a steel crankshaft, the plurality of steel piston assemblies, and an engine coolant system. The iron crankcase can include a plurality of cylinder walls defining a respective plurality of cylinders. The cylinder walls can further define a plurality of water jackets, each water jacket at least partially surrounding a respective one of the plurality of cylinders. The steel crankshaft can be rotatably mounted at least partially within the iron crankcase. Each of the steel piston assemblies of the plurality of steel piston assemblies can include a piston head received within a respective one of the plurality of cylinders, and a connecting rod operably coupled to the steel crankshaft. The engine coolant system can have a pump, one or more temperature sensors, a radiator, and a radiator bypass valve. The engine coolant system can be configured to activate the radiator bypass valve and continue to circulate coolant within the plurality of water jackets if the one or more temperature sensors detect a cylinder wall temperature of less than approximately 222° C.

In one embodiment, the ferritic aero diesel engine is configured to run for an extended period of time at a reduced power setting with a complete loss of engine coolant. In one embodiment, adjacent cylinders of the ferritic aero diesel engine are spaced approximately 12 mm apart, and the space between cylinder walls defines a water jacket between the adjacent cylinders. In one embodiment, the closed-loop engine coolant system is configured to circulate coolant through the water jacket to aid the ferritic aero diesel engine in maintaining the temperature of the cylinders to facilitate combustion.

In one embodiment, the ferritic aero diesel engine with accessories weighs between approximately 595-680 lbs. (without operating fluids). In one embodiment, the ferritic aero diesel engine is configured to produce between approximately 300-450 hp. In one embodiment, the ferritic aero diesel engine further comprises an engine lubrication system having a first centrifuge mechanism configured to separate blow-by gases from lubricating oil, and a second centrifuge mechanism configured to further separate aerosolized lubricating oil from the blow-by gases. In one embodiment, the ferritic aero diesel engine further includes an Engine Electronic Control Unit (EECU) configured to at least one of compensate for variances in the quantity or concentration of cetane in the diesel fuel, conduct a pressure check, calculate and Indicated Mean Effective Pressure (IMEP), adjust individual contribution from the cylinders in a way that the resultant overall torque signal does not resonate with known system natural frequencies, or a combination thereof.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 2A is a side cross-sectional view depicting an aero diesel engine member in accordance with an embodiment of the disclosure.

FIG. 6A is a partial cross sectional view depicting stress concentration within a threaded bore of an aluminum alloy crankcase of the prior art.

FIG. 6B is a partial cross sectional view depicting stress concentration within a threaded bore of a cast-iron crankcase in accordance with an embodiment of the disclosure.

FIG. 7A is a bottom view depicting a aero diesel engine with threaded bore connections in accordance with an embodiment of the disclosure.

FIG. 7B is a cross-sectional view depicting the crankcase of FIG. 7A.

FIG. 7C is a cross-section view depicting a crankcase with threaded bore connections in accordance with an embodiment of the disclosure.

FIG. 8 is a side elevation view depicting an aluminum alloy piston assembly of the prior art.

FIG. 9A is a cross-sectional view depicting the aluminum alloy piston assembly of FIG. 9.

FIG. 10 is a side elevation view depicting a steel piston assembly in accordance with an embodiment of the disclosure.

FIG. 10A is a cross-sectional view depicting the aluminum alloy piston assembly of FIG. 10.

FIGS. 14A-C collectively represent a schematic view depicting an engine lubrication system in accordance with an embodiment of the disclosure.

Figure 1:
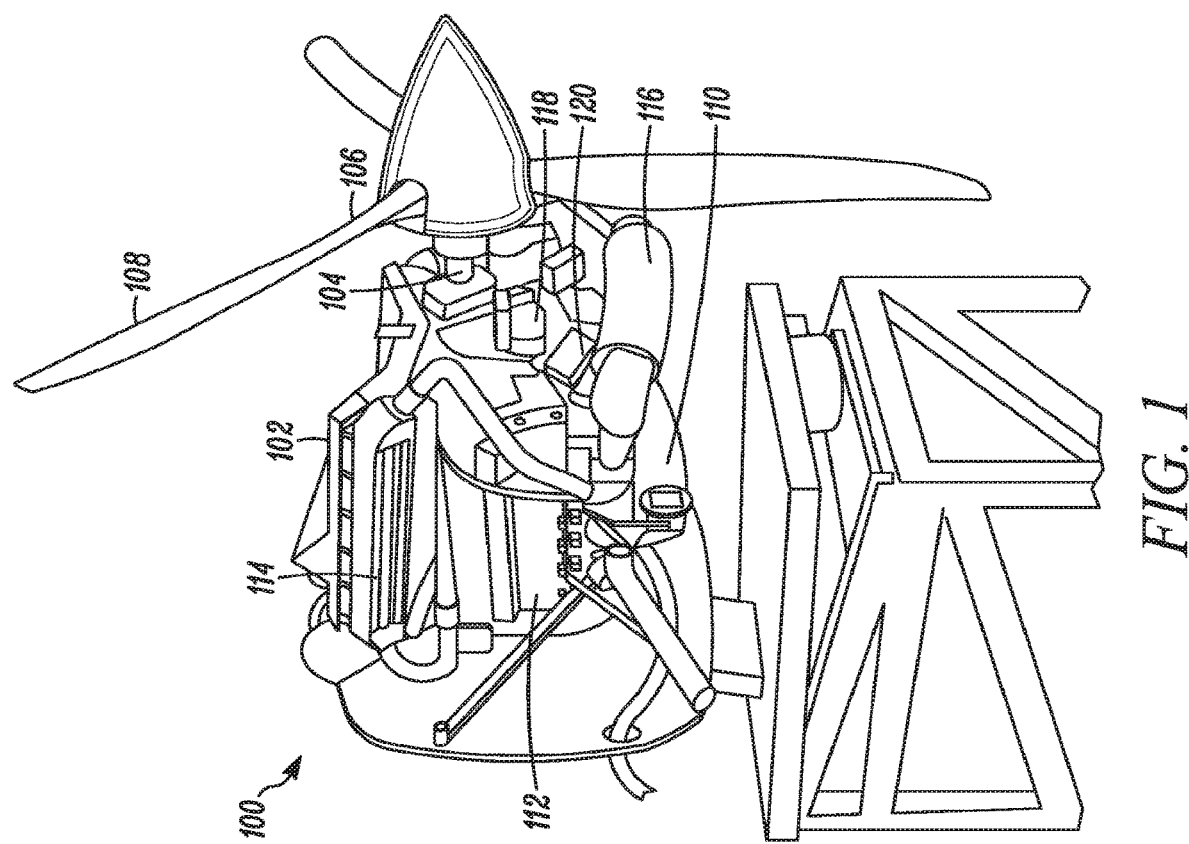
FIG. 1 is an angled view depicting an aero combustion drive assembly in accordance with an embodiment of the disclosure.
Figure 2B:
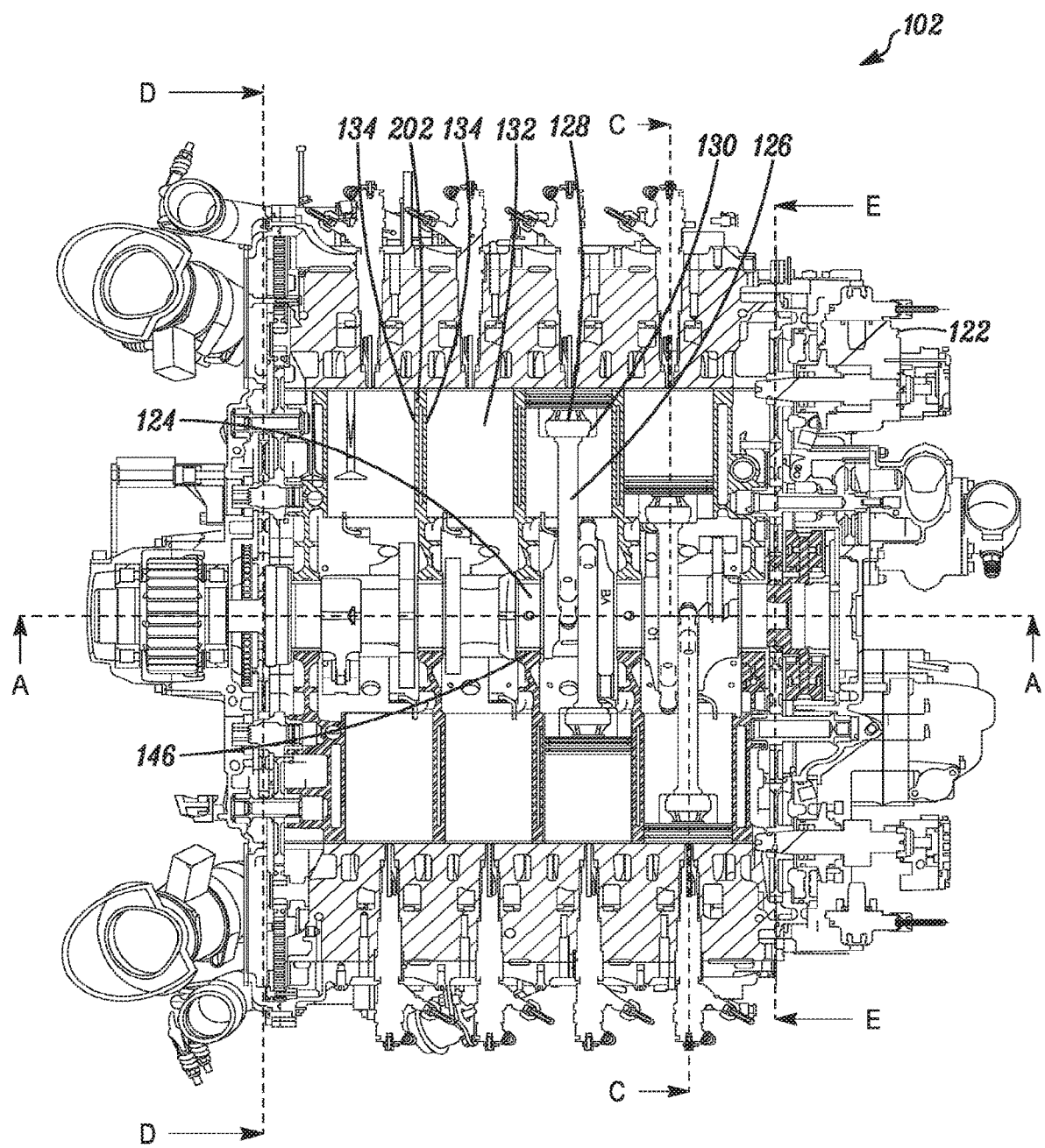
FIG. 2B is a top cross-sectional view depicting the aero diesel engine member of FIG. 2A.
Figure 2C:
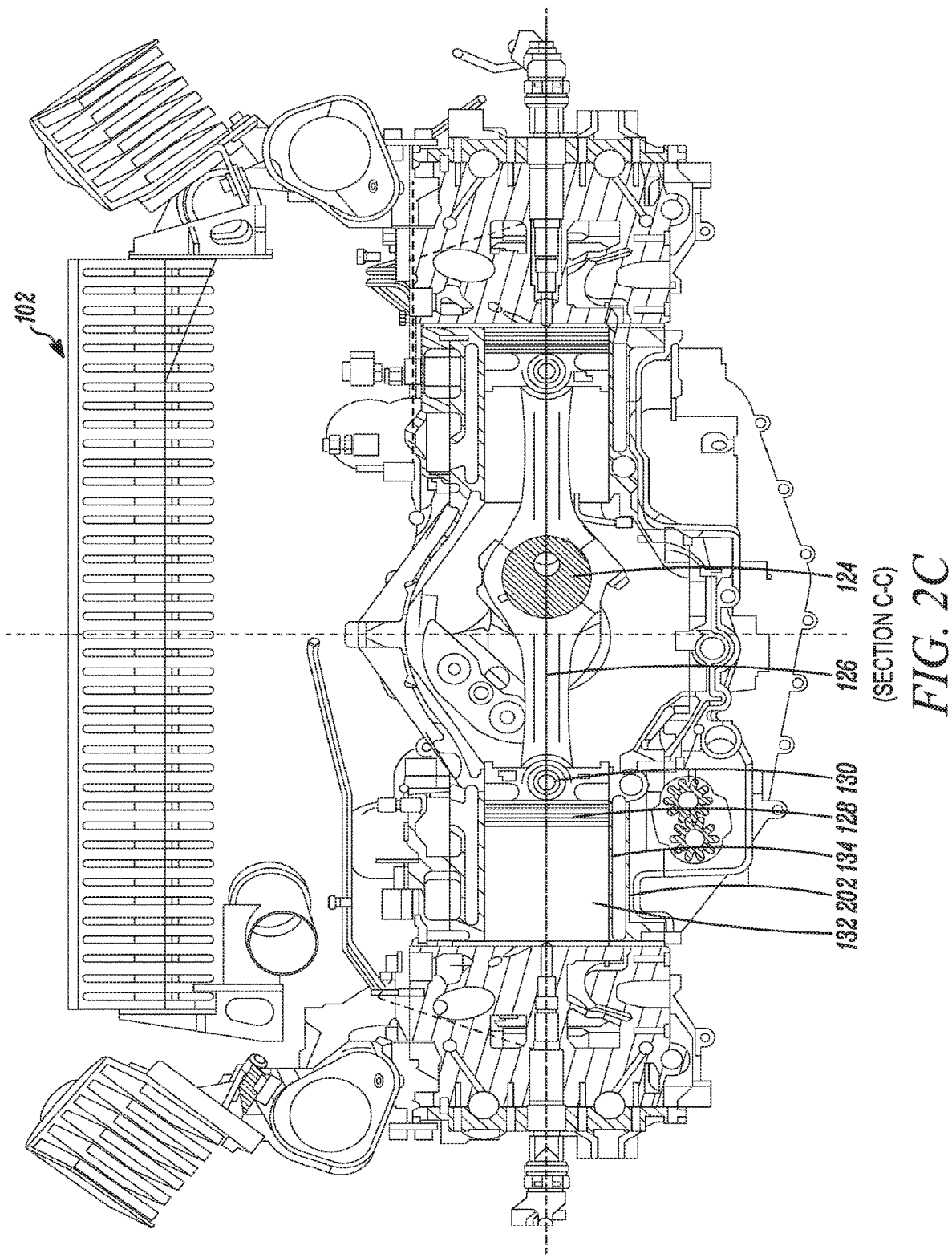
FIG. 2C is a mid-section cross-sectional view depicting the aero diesel engine member of FIG. 2A.
Figure 2D:
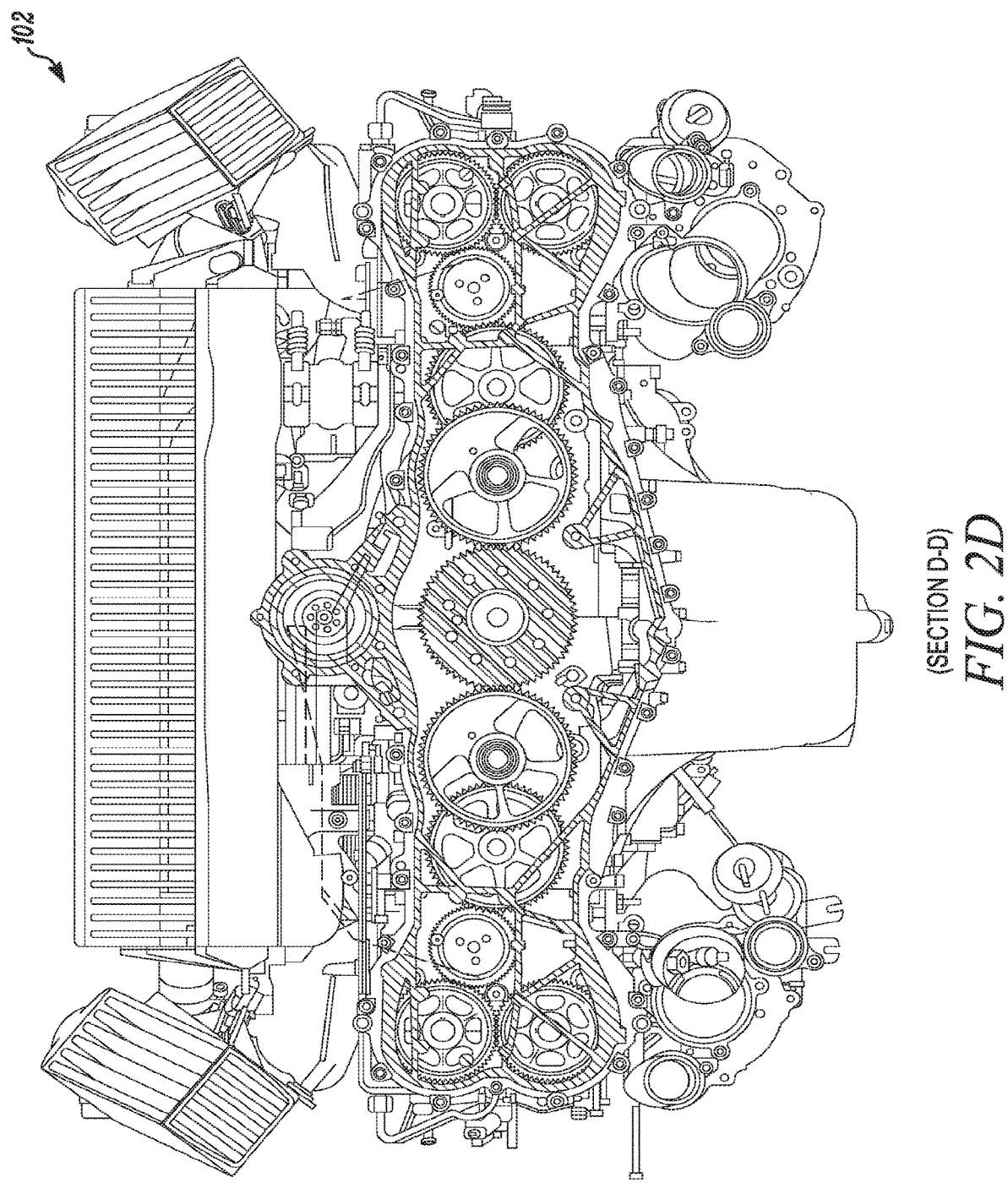
FIG. 2D is a front cross-sectional view depicting the aero diesel engine member of FIG. 2A.
Figure 2E:
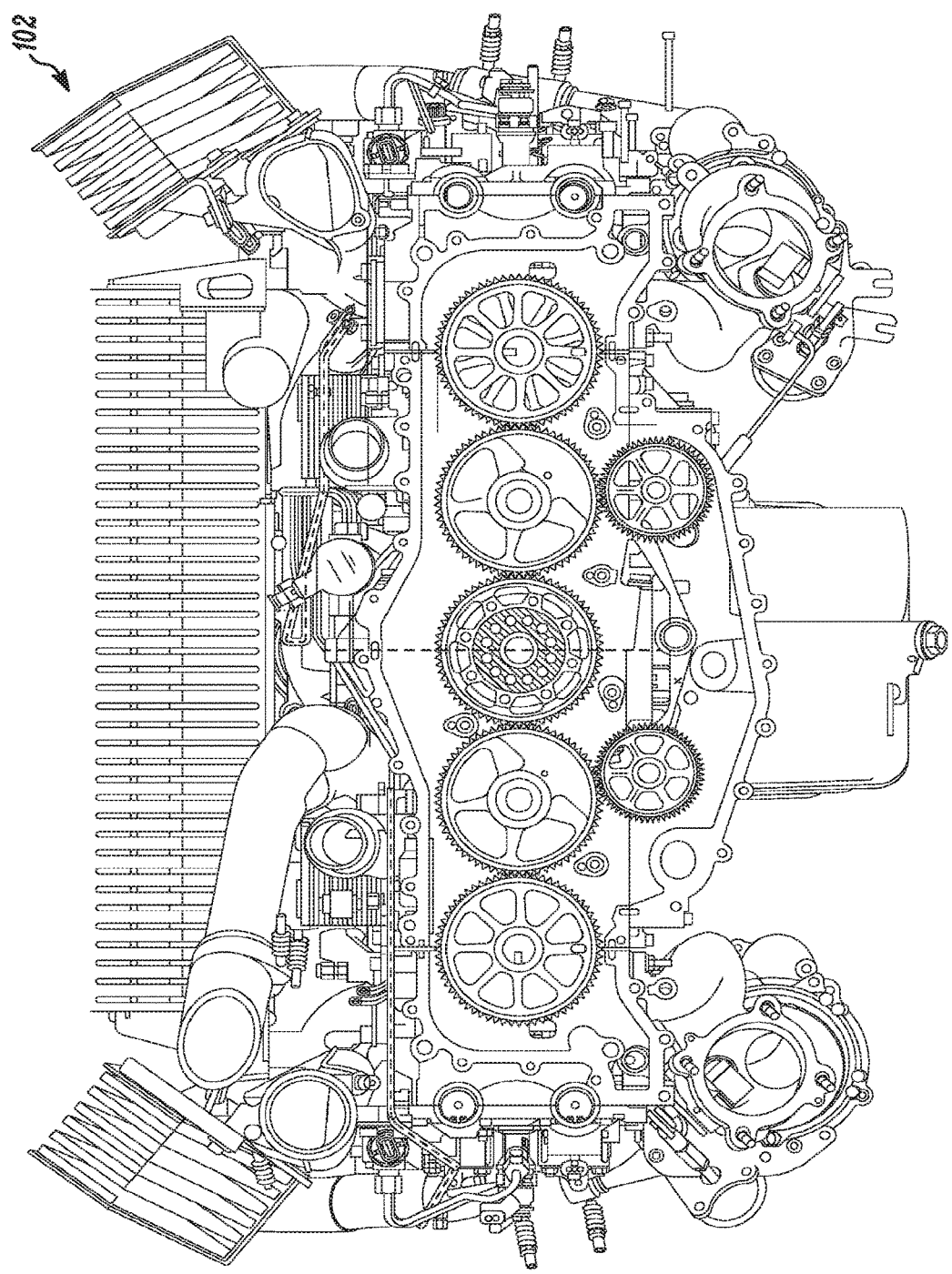
FIG. 2E is a rear cross-sectional view depicting the aero diesel engine member of FIG. 2A.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an angled view of an aero combustion drive assembly 100 is depicted in accordance with an embodiment of the disclosure. The aero combustion drive assembly 100 can include an aero diesel engine member 102, a transfer member 104 and propeller 106. In one embodiment, the propeller can have three blades 108. The aero combustion drive assembly 100 can optionally further include a lubrication system 110 (as further depicted in FIG. 14), a cooling system 112 (as further depicted in FIG. 12), an air-fuel charge injection system 114 (as further depicted in FIG. 15), an exhaust system 116, a starter motor 118, a tachometer output 120, and other accessories.

For decades, the general trend in aero engine design has been to construct at least the crankcase and pistons out of aluminum. In particular, because the weight of the pistons affect the dynamic balance of the engine and the loading of the bearings in the crank-rocker mechanism, and aero diesel engines require high compression ratios to initiate combustion, it was believed that the use of a material other than an aluminum alloy would result in a much heavier engine which produces no more power than an aluminum equivalent. The same applies to the crankcase, which for decades has been constructed out of aluminum for the purpose of minimizing the overall weight of the engine. As the demand for new aircraft engines has continued to focus on increasing the power density (i.e., producing lighter weight engines that produce more power), aircraft engine designers have continued to steer away from the use of heavier materials, such as iron, steel and other ferritic materials.

Recent advances in material science, Computer-Aided Engineering (CAE) analysis techniques, and sand core technology, including the ability to "print" high-quality sand cores of complex geometry, has enabled the casting of thin-walled structures with consistent material properties, which had previously not been possible. Armed with the knowledge that ferritic materials are less prone to thermal expansion and contraction, have better heat retention properties, and are generally more robust than aluminum alloys, Applicants of the present disclosure set out to design a high power, lightweight aircraft engine using ferritic materials, which consumes less oil and is generally more reliable than an aircraft engine constructed of aluminum alloys.

Referring to FIGS. 2A-D, various views of an aero diesel engine member 102 are depicted in accordance with embodiments of the disclosure. In one embodiment, the aero diesel engine member 102 can include a crankcase 122, a crankshaft 124, a plurality of connecting rods 126, and a corresponding plurality of pistons 128 and piston pins 130. In one embodiment, each of the components of the aero diesel engine member 102 can be constructed of a ferritic material. For example, in one embodiment, the crankcase 122 can be constructed of cast-iron, and the crankshaft 124, connecting rods 126, pistons 128 and piston pins 130 can be constructed of steel.

I. Iron Crank Case

Figure 12:
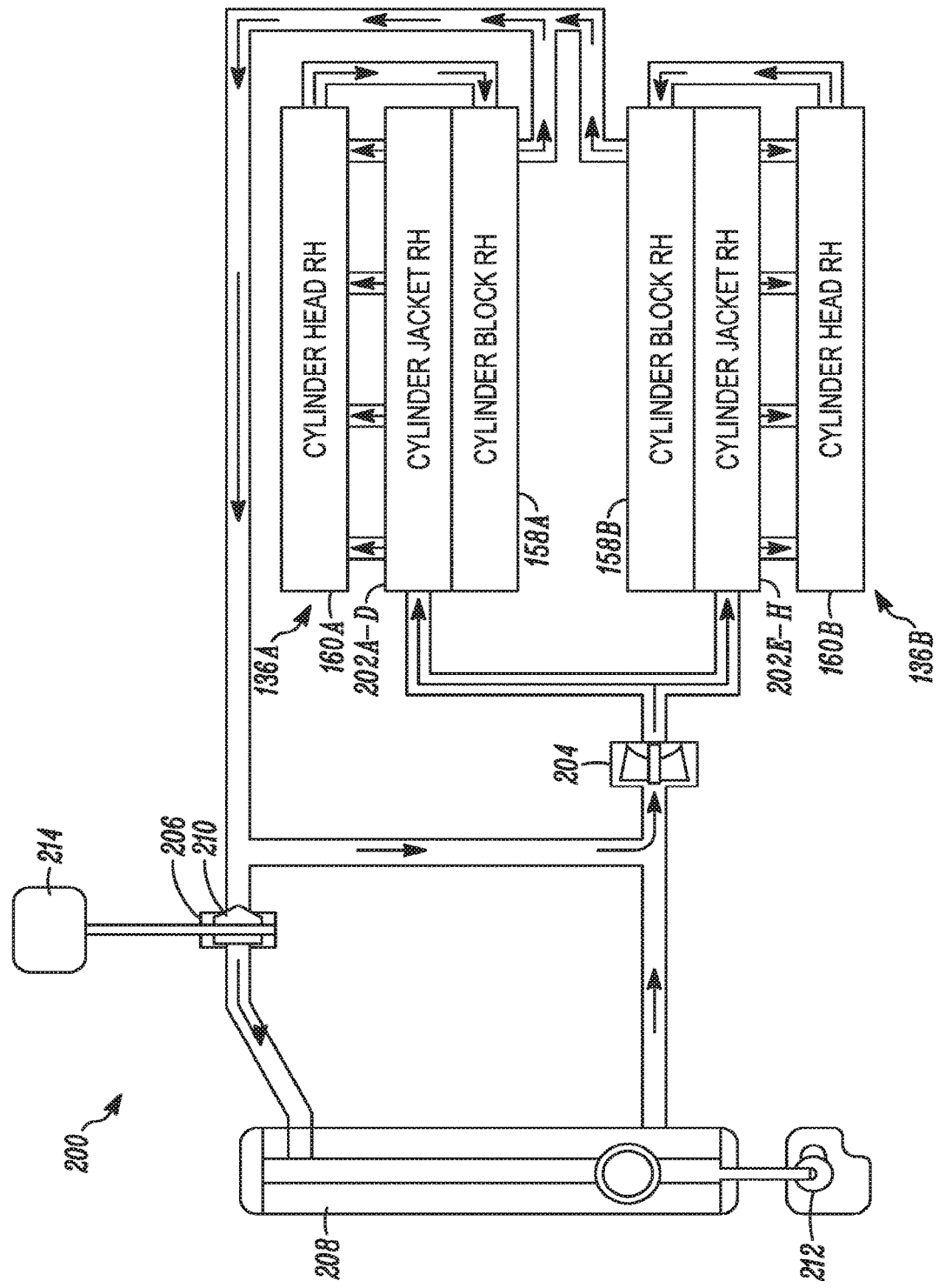
FIG. 12 is a schematic view depicting an engine coolant system in accordance with an embodiment of the disclosure.

Ferritic material, such as cast-iron, offers enhanced material properties with defined endurance strength, not possible in aluminum structures. Referring to Table 1 (below), the material properties of cast-iron are compared to aluminum. Cast-iron exhibits a higher ultimate tensile strength and higher Brinell hardness than aluminum. Accordingly, a crankcase 122 constructed of cast-iron does not require a surface treatment modification or an iron piston bore liner insert, which is commonplace with aluminum crankcase housings (i.e., the pistons 128 can run directly within the bores 132). Accordingly, the material properties of cast-iron in combination with the ability to cast thin-walled structures enables the cylinders 132 to be pitched much closer together, which in turn enables the crankcase 122 to be more compact and use less material than a crankcase constructed of aluminum. For example, in one embodiment, the engine member 102 can include a plurality of cylinders 132 having a bore diameter of approximately 86 mm, pitched approximately 98 mm apart. In other words, the space between the cylinders 132 can measure approximately 12 mm, and can comprise a pair of cylinder walls 134 measuring between approximately 4.8 and 5.2 mm, spaced apart so as to define a water jacket 202 (as depicted in FIG. 12) measuring between approximately 1.6 and 2.4 mm. Accordingly, in one embodiment, the aero diesel engine 102 (without operating fluids) weighs no more than 680 lbs. with its usual accessories. For example, in one embodiment, the aero diesel engine 102 weights between approximately 595 and 680 lbs., with an average weight of approximately 605 lbs.

TABLE 1

| Material Property | Units | Cast Iron GJV 450 | Aluminum A 390.0 |
|---|---|---|---|
| Ultimate Tensile Strength | MPa | 450 | 275 |
| Elastic Modulus | GPa | 145 | 80 |
| Elongation | % | 1-2% | 1% |
| Rotating-Bending Fatigue (20° C.) | MPa | 210 | 100 |
| Rotating-Bending Fatigue (225° C.) | MPa | 205 | 35 |
| Thermal Conductivity | W/m-K | 36 | 130 |
| Thermal Expansion | µm-m-k | 12 | 18 |
| Density | g/cc | 7.1 | 2.7 |
| Brinell Hardness | BHN 10-3000 | 215-255 | 110-150 |

In one embodiment, the aero diesel engine member 102 can include a plurality of cylinder walls 134 defining a corresponding plurality of piston bores, alternatively referred to as cylinders 132. For example, in one embodiment, the aero diesel engine member 102 can define eight cylinders 132a-h, in a flat opposed configuration, with four cylinders in a first bank and an opposed four cylinders and a second bank separated by an angle of 180° (referred to herein as a FLAT-VEE configuration). In one embodiment, the plurality of cylinder walls 134 can define a respective plurality of substantially cylindrical (i.e., substantially round cross-section) cylinders 132. In one embodiment, the total cylinder 132a-h displacement can be 4.3 L. In other embodiments, larger or smaller displacements can be utilized.

In some embodiments, the FLAT-VEE configuration enables the crank case 122 to be constructed with less material, thereby minimizing the overall weight of the aero diesel engine 100. Additionally, the FLAT-VEE configuration is useful in aircraft having multi-engine configurations, or where the aerodynamic drag of the engine package(s) becomes a more important design consideration. In one embodiment, aero diesel engine 102 can produce between approximately 300 and 450 hp, and can be comparable to the weight of an air cooled, opposed six cylinder engine.

Figure 3:
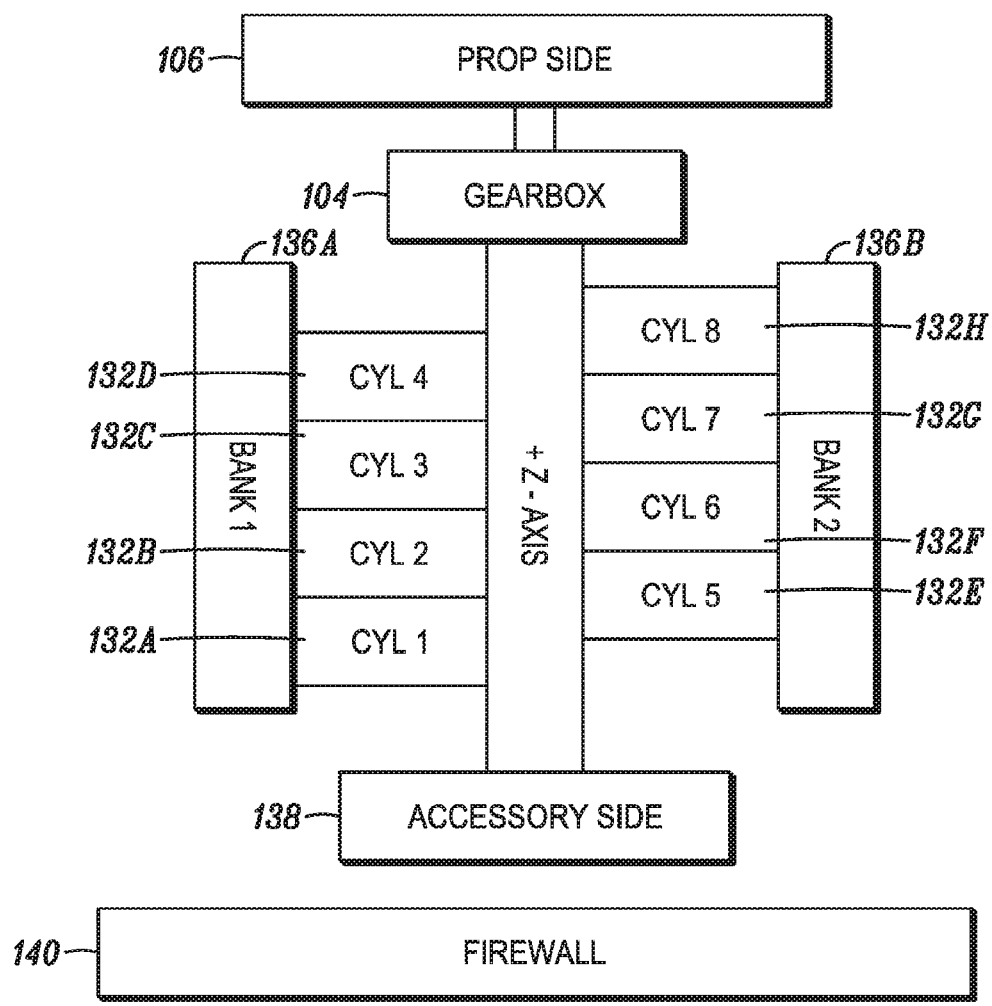
FIG. 3 is a schematic view depicting a portion of an aero combustion drive assembly in accordance with an embodiment of the disclosure.

Referring to FIG. 3, a schematic view of a portion of the aero combustion drive assembly 100 is depicted in accordance with an embodiment of the disclosure. The aero combustion drive assembly 100 can include an aero diesel engine 102 having a first bank of cylinders 136a, including cylinders 1-4 (132a-d), and a second bank of cylinders 136b, including cylinders 5-8 (132e-h). A transfer member 104 (alternatively referred to as a gearbox 104), can be positioned proximal to a first end of the engine member 102. The propeller 106 can be operably coupled to the transfer member 104. Accessories 138 can be positioned proximal to a second, opposite end of the engine 100. A firewall 140 can be positioned proximal to the accessories 138.

Figure 4:
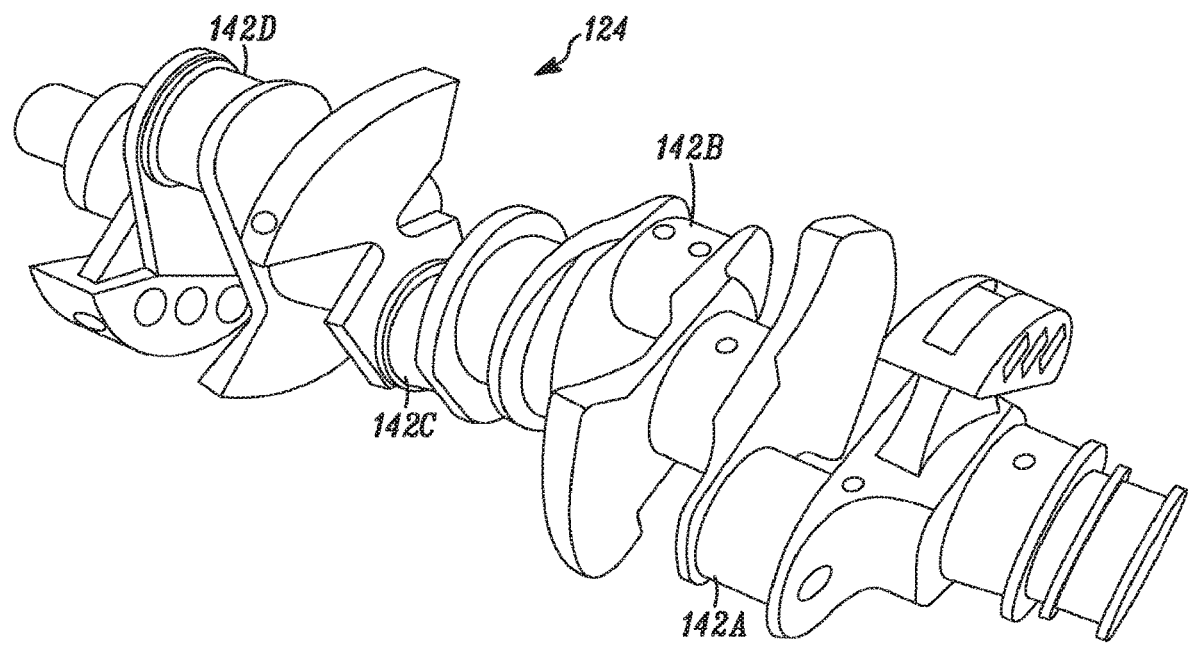
FIG. 4 is an angled view depicting a crankshaft in accordance with an embodiment of the disclosure.
Figure 5:
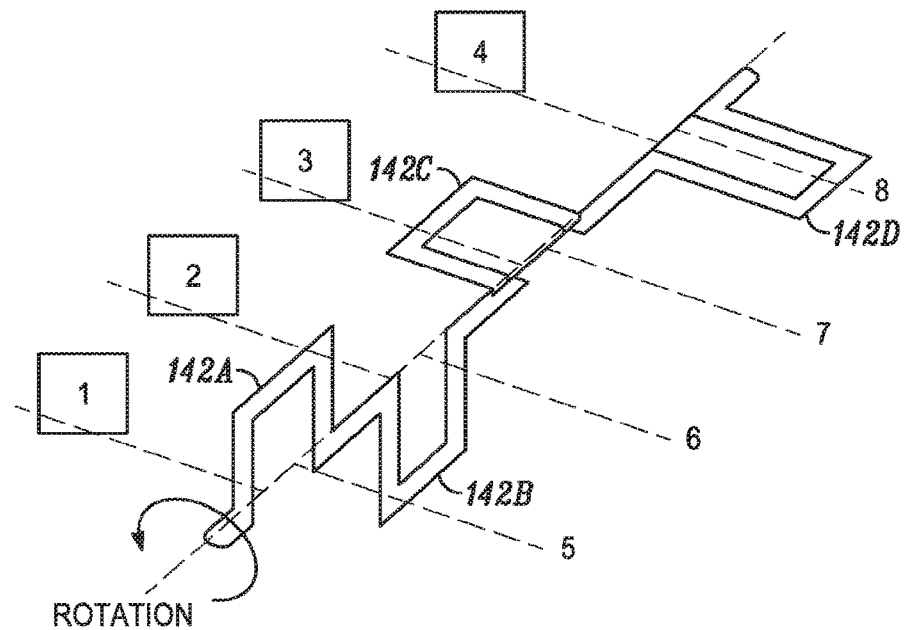
FIG. 5 is a simplified, graphical representation of the orientation of the crank throws and their connection to a plurality of piston assemblies slidably received within a respective plurality of engine cylinders in accordance with an embodiment of the disclosure.

Referring to FIG. 4, an angled view of a crankshaft 124 is depicted in accordance with an embodiment of the disclosure. In one embodiment, the crankshaft can have four crank throws 142a-d, thereby pairing sets of cylinders 132. FIG. 5 depicts a simplified graphic representation of the four crank throws 142a-d. In one embodiment, cylinders 1 and 5 are rotatably coupled to crank throw 142a, cylinders 2 and 6 are rotatably coupled to crank throw 142b, cylinders 3 and 7 are rotatably coupled to crank throw 142c, and cylinders 4 and 8 are rotatably coupled to crank throw 142d. Accordingly, each of the paired cylinders operate opposite to one another within the combustion cycle. In one embodiment, the firing order of the cylinders is 1-7-5-3-6-4-2-8.

The enhanced stiffness (elastic modulus) and strength exhibited by cast-iron minimizes bore 132 distortion during operation due to high cylinder pressure. With reduced bore 132 distortion, the engine 102 can be configured to consume less oil, require less spring tension for proper sealing, exhibit less blow-by and corrosive acidic exhaust distillates in the oil, and exhibit less wear on sliding components.

In addition to the enhanced stiffness, the cast-iron crankcase 122 exhibits less material fatigue over time. Threaded areas that experience frequent, high stress loads are particularly prone to material fatigue. In particular, these areas can include the threaded areas surrounding the cylinder head attachment bolts and the main bearing retention bolts.

Referring to FIGS. 6A-B, an aluminum threaded bore 144a under a high stress load can be compared to a cast-iron threaded bore 144b under an equivalent stress load. As depicted in FIG. 6A, extended fatigue can promote cracking in the roots of the threaded area of the aluminum crankcase, where the stress tends to concentrate. Over the life of the engine, the threads may be damaged to the point where the threaded areas of bore 144a are rendered unserviceable. In such cases, the threaded areas must be repaired (for example with HELICOIL), or the aluminum crankcase must be replaced. A concentration of stress in a threaded bore 144 can also increase distortion in the cylinders 132 during operation, which can lead to frictional wearing and an increase in oil consumption.

By contrast, as depicted in FIG. 6B, a crankcase 122 constructed of a ferritic material, such as cast-iron, is not prone to such failure as the rigidity of the ferritic material enables the stress to be more equally distributed across the threaded bore 144b. Moreover, a crankcase 122 constructed of ferritic materials, can employ less material and smaller threaded areas than their aluminum equivalents, thereby contributing to a reduction in material required to construct the crankcase 122.

With additional reference to FIGS. 7A-C, to further inhibit the concentration of stress loads, in one embodiment, long head bolts 170 terminating proximal to the bottom 172 of the cylinders 132 are utilized. Additionally, diagonal ribs 174 can be formed in the crankcase 122 to aid in dispersing the resultant forces from the head bolts 170 and improving the structural integrity of the crankcase 122.

Ferritic material also presents a lower thermal conductivity, and less thermal expansion than aluminum. Thermal expansion of a crankcase 122 must be compensated for in the journal bearings 146 surrounding the crankshaft 124 (as depicted in FIGS. 2A-D). Traditionally, the clearance between the journal bearings 146 and the crankshaft 124 are dimensioned to minimize friction. Additional clearance must be added to inhibit shell scoring and shell rotation during low temperature operation and cold starts. This additional clearance can result in excess oil flow and a loss of oil pressure during high operating temperatures.

In comparison to aluminum crankcases, the clearances of a ferritic (e.g., cast-iron) crankcase 122 are much more controllable, and do not need to be compensated for in hot/cold conditions. This is due to the similar coefficient of thermal expansion, and makes for a more stable bearing system with less clearance and eccentricity required. For example, in one embodiment, the bearing clearances coincide with a range of tolerances that are expected to be compensated by different bearing shells. Manufacturing tolerances are reduced with machine tool rigidity, grinding accuracy, and other thermal and tool rigidity.

Figure 8:
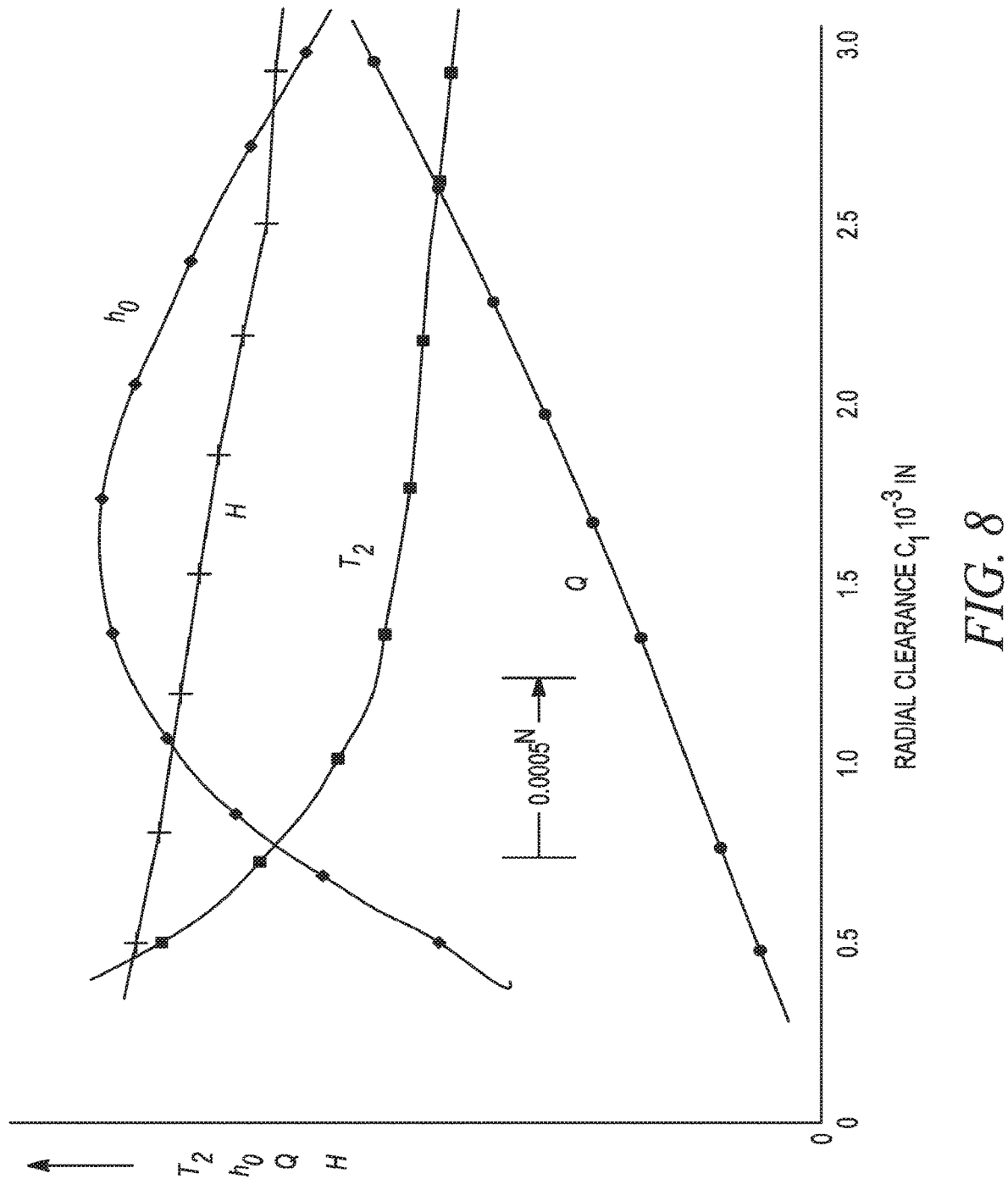
FIG. 8 depicts an optimization curve for a combustion-compression engine journal bearing.

Referring to FIG. 8 a typical optimization curve for a defined journal bearing 146 is depicted. In this diagram, $h_o$ represents a film thickness, Q represents an oil flow, $T_2$ represents an exit oil temperature, and H represents heat generated. As depicted, there is a unique optimum band which is determined for the radial clearance of a new journal bearing 146 (e.g., 0.0005 inches). With an aluminum crankcase, the clearance must be increased compensate for low temperature conditions. As the radial clearance increases the oil flow (Q) increases. A problem results when the engine temperature increases, causing a further increase in oil flow (Q), and a resulting lower system oil pressure. At some point, the oil film is reduced to a point that it can no longer sustain the bearing load, resulting in metal on metal contact.

A ferritic combination of crankshaft 124 and crankcase 122 need only be compensated for normal frictional wear due to a consistent thermal expansion ratio for both components. Thus, the journal bearing 146 can be tuned to match the statistical manufacturing tolerances, and disregard thermal expansion as part of the calculation. For example, in one embodiment, the radial clearance of the journal bearing 146 can be between approximately 35 and 55 μm.

II. Steel Piston Assemblies

Referring to FIGS. 9-10A, a piston assembly 148 constructed of aluminum can be compared to a piston assembly 150 of the present disclosure, which is constructed of a ferretic material, such as steel. The ferretic piston assembly 150 can include a steel piston 128, steel piston pin 130 and steel connecting rod 126. As depicted in earlier figures, the steel pistons 128 can be configured to operate within the respective piston bores 132 of a cast-iron crankcase 122. For comparative purposes, the aluminum piston assembly 148 of the prior art can include an aluminum piston 152, and aluminum piston pin 154, and a steel connecting rod 156.

Figure 11:
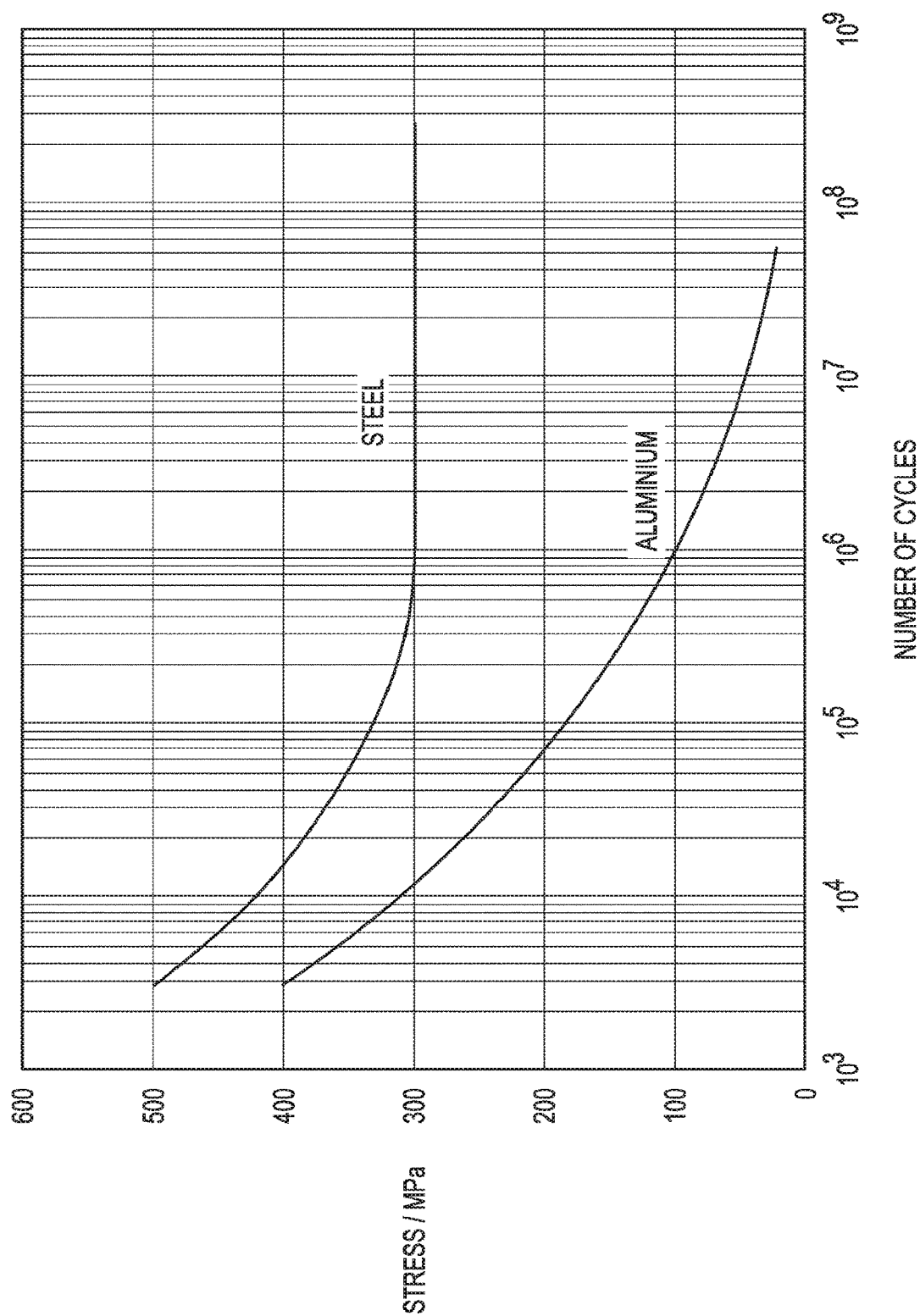
FIG. 11 is a graphical representation depicting the endurance limits of steel and aluminum.

FIG. 11 is a graph depicting the endurance limits of steel and aluminum. As depicted, steel can withstand a higher magnitude of stress than aluminum before causing plastic deformation and/or failure. Moreover, as the number cycles of fluctuating stress are increased, steel consistently outperforms aluminum in fatigue life. In particular, a component constructed of steel can withstand an infinite number of stress cycles with a peak stress of 300 MPa or less, whereas an identical component constructed of aluminum fails after only around 10,000 ($10^4$) cycles. The fatigue limit in aluminum further degrades with an increase in temperature. Accordingly, unlike aluminum which continuously degrades under stress, steel engine components, such as steel piston 128, can be designed to have an infinite life (aside from frictional wearing).

Referring again to FIGS. 9-10A, the enhanced strength of steel enables a steel piston 128 to be constructed with less material than is necessary for the construction of an aluminum piston 152. In particular, the steel piston assembly 150 of the present disclosure enables a reduction in the overall compression height (H1), in comparison to the equivalent compression height (H2) of a conventional aluminum piston assembly 148. As a result of the reduced compression height H1, the width of the crankcase 122 can also be reduced to create a narrower engine member 102, which presents an even greater reduction in size and weight savings than the reduction in size and weight savings afforded by the steel pistons 128 alone.

Additionally, the steel pistons 128 can be constructed with a smaller pin boss area 158, which is the area of the piston 128 that distributes the gas forces to the piston pin 130. Moreover, a piston pin 130 constructed of steel can be smaller in diameter than a conventional aluminum piston pin 154, without continued degradation and/or fear of distortion due to bending. Together, these features enable a steel piston assembly 150 to be constructed using less material than a conventional aluminum piston assembly, thereby making the steel piston assembly 150 competitive with conventional aluminum piston assemblies 148, without the drawbacks that are apparent in aluminum pistons 152.

Another notable drawback of using aluminum is its large a coefficient of linear thermal expansion. In particular, the coefficient of linear thermal expansion of aluminum is nearly double that of steel (i.e., a steel piston 128 has a linear thermal expansion rate of one half that of an aluminum piston 152). Existing aluminum compression-combustion aviation engines generally use an iron piston bore liner in conjunction with the aluminum piston assembly 148. Accordingly, the aluminum pistons 152 must be designed with a sufficient clearance so that the outer diameter of the aluminum piston 152 can expand within the iron piston bore liner without seizing. For large bore engines, the required clearance can be significant. Aluminum pistons 152 that do not have sufficient clearance have an increased risk of experiencing shock cooling, where at least one of the aluminum pistons 152 momentarily seizes within its cylinder as a result of rapid cooling, for example during a low-power descent.

A. Reduced Oil Consumption and Piston Slap

The large required clearance between the aluminum piston 152 and piston bore results in increased oil consumption as lubricating oil leaks into the combustion chamber, and mixing of the lubricating oil with blow-by of exhaust gases escaping into the crankcase. Although the blow-by gases are vented from the crankcase, the vented gases typically carry a mist of lubricating oil with it, thereby further depleting lubrication oil reserves. In many cases, traces of the inadvertently vented lubrication oil are observable on the belly of an aircraft after flight. Moreover, the blow-by gases contain acids which accumulate in the oil over time. The corrosive nature of the distilled exhaust products can destroy the internal engine components, particularly when the aircraft is stored for an extended period of time after use.

In sharp contrast, a piston 128 and cylinder 132 combination, both constructed of a ferritic material, need only compensate for the temperature differences between the pistons 128 and cylinder walls 134 defining the cylinders 132. The reduced clearance directly results in a reduction in oil consumption, as less oil passes into the combustion chamber, and less blow-by gases pass into the crankcase 122. Additionally, less ring tension is required, which in turn results in less frictional loss in the engine. Moreover, a reduced piston-cylinder clearance results in quieter operation as a result of a reduced "piston slap" (which is a characteristic of increased clearance between a piston 128 and piston bore 132), thereby resulting in quieter engine operation.

B. Increased Performance Capabilities

Moreover, the strength of an aluminum piston 152 is typically limited by its operating temperature. That is, as the temperature increases and the aluminum becomes more elastic, the fatigue strength experienced at normal operating temperatures (as depicted in FIG. 11) is reduced, and the load bearing characteristic of the pistons 152 are frequently limited to a peak cylinder pressure of less than 205 bar. Because pistons are not as easily cooled as the walls of the cylinder, and typically retain heat for a longer period of time, the pistons are often the limiting component for engine performance.

Steel pistons 128 are more resistant to temperature, and are able to operate at higher temperatures without a significant degradation of fatigue strength. In particular, they are capable of operating at a peak cylinder pressure approaching 240 bar (representing a 15% increase over their aluminum counterparts). Accordingly, the use of steel pistons 128 in place of aluminum pistons 152, enables a higher specific power production with an engine having the same displacement (i.e., the same piston bore 132 size).

C. Natural Protection in the Event of Coolant Loss

The improved fatigue strength of ferritic materials at high temperatures also offers natural protection against piston seizure in the event of a loss of coolant. In one embodiment, an aero diesel engine 102 having an iron crankcase 122 and steel piston assemblies 150 can be configured to run for extended periods of time at a reduced power setting (i.e., lower power settings) with a complete loss of coolant. Accordingly, embodiments of the present disclosure, present an aero diesel engine 102 that can continue to produce a limited amount of power while sustaining damage due to overheating, as opposed to a complete engine failure as a result of the seizing of aluminum pistons 152 within their cylinders 132.

D. Improved Combustion Stability and Restarting at Altitude

In addition to a lower thermal expansion and improved fatigue strength at higher temperatures, ferritic materials also have a lower thermal conductivity, meaning that ferritic materials tend to retain their heat for a longer period of time. Retaining heat from combustion can be particularly important in maintaining proper combustion in all realms of flight, including rapid power changes following a low-power descent, and during high altitude restarts.

A known detraction of air cooled diesel engines is a lack of combustion stability, or even a complete freezing of combustion, at low-power loads, for example during a long descent or when operating at idle for a sustained period in a cold air environment (e.g., −15° C. at an altitude 15,000 feet). This condition is exaggerated with aluminum crankcases, which can rapidly reject heat due to conduction and convention, particularly when subjected to the cold air stream presented by an increase in speed during descent from a high-altitude.

Steel pistons 128 in combination with an iron crankcase 122 can enhance combustion stability due to their higher operating temperatures (approaching 500° C.), and their ability to retain heat even after combustion ceases. In some embodiments, combustion stability can further be enhanced by preparing the fuel for combustion in the compressed "red gas" atmosphere of the combustion chamber. For example, the air turbulence can be enhanced by the inlet port geometry and/or cam timing. The fuel atomization can be enhanced by the injection geometry. The geometry of the combustion chamber can be enhanced to optimize the piston bowl. Heat transfer from the piston "point" can be maximized as the fuel stream impacts the hot piston. And, the inlet air and/or fuel can be heated to promote combustion.

A higher operating temperature of steel pistons 128 also make engine restarts at high altitudes possible. Most diesel engines rely on a combination of compression and retained heat within the engine cylinders to sustain combustion. When starting, diesel engines typically use glow plugs. The function of a glow plug is to assist in heating the incoming air-fuel charge to promote ignition during starting. Once the engine cylinders have reached a temperature sufficient to sustain combustion, the heating assistance provided by the glow plugs can be discontinued. During operation, many diesel engines further rely on a turbocharger to pre-compress the air prior to entering combustion chamber, particularly in high altitudes where the air is thin (i.e., where there are fewer oxygen molecules within a given volume of air, as compared to the air at ground level).

When combustion ceases, the combustion chamber begins to cool and the turbocharger may spool down or even completely stop. Because the air at high altitude is both extremely cold and thin, restarting the engine at a high altitude can be difficult. Accordingly, most aircraft configured with aluminum engines must descend to where the air is warmer and denser before re-ignition as possible. However, in some cases a descent may not be possible, for example when flying in mountainous terrain, or where further descent would bring aircraft within the effective range of ground-based anti-aircraft weaponry.

The higher operating temperatures common with steel pistons 128, and the ability of steel piston assemblies 150 and a cast-iron crankcase 122 to retain their heat, facilitates both combustion stability in extremely cold conditions and better re-ignition results at altitude. Combustion stability and restarting at altitude can be further enhanced by thermostatically controlling the engine 102 with a coolant system.

III. Coolant System

Referring to FIG. 12, a schematic view of a closed loop engine coolant system 200 is depicted in accordance with an embodiment of the disclosure. The engine coolant system 200 can be configured to circulate coolant, such as an antifreeze solution (e.g., a 50% ethanol/50% glycol mix), through a conduit to provide cooling to portions of the engine member 102. For example, in one embodiment, the engine coolant system 200 can provide cooling to a first and second cylinder block 158a-b and a first and second cylinder head 160a-b (the first and second cylinder blocks and first and second cylinder heads comprising portions of the respective first and second cylinder banks 136a-b).

Figure 13:
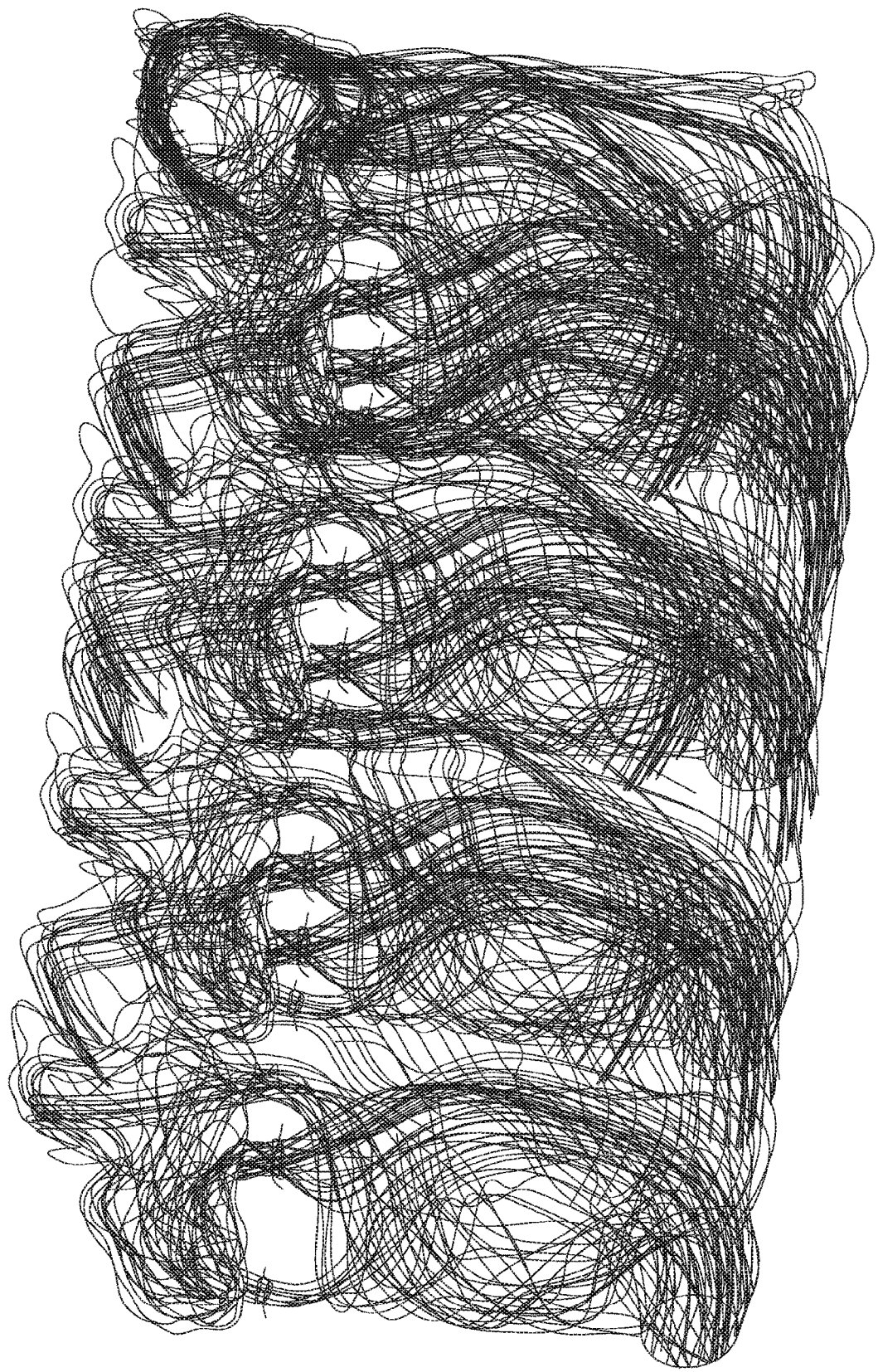
FIG. 13 an angled view depicting coolant flowing through a plurality of water jackets is depicted in accordance with an embodiment of the disclosure.

In one embodiment, the engine coolant system 200 can include a plurality of water jackets 202a-h, one or more pumps 204, one or more temperature sensors 206, a radiator 208, a radiator bypass valve 210, and a heat expansion and/or reservoir tank 212. In one embodiment, the cylinder walls 134 defining the cylinders 132a-h can further define the plurality of water jackets 202a-h, such that each water jacket 202a-h at least partially surrounds a respective one of the plurality of cylinders 132a-h. Referring to FIG. 13, an angled view of coolant flowing through the plurality of water jackets 202a-h is depicted in accordance with an embodiment of the disclosure.

A pump 204 can be employed to circulate coolant around each of the respective cylinder banks 136a-b. In other embodiments, a greater or lesser number of pumps 204 can be employed. The radiator 208 can be configured to enable an exchange of heat between the coolant and a flow of air over the radiator 208. In one embodiment, the coolant can be regulated to approximately 222° F. or less. The heat expansion and/or reservoir tank 212 can be configured to store a quantity of coolant within the engine coolant system 200.

The one or more temperature sensors 206 can be configured to sense the temperature of the engine coolant. In one embodiment, at least one temperature sensor 206 is associated with each cylinder 132. In other embodiments, one or more temperature sensors 206 can be located within a conduit of the engine coolant system 200. The one or more temperature sensors 206 can be operably coupled to a controller 214, configured to receive and process sensed temperature information, as well as to a control radiator bypass valve 210. In one embodiment, the controller 214 can be configured to send a signal to activate the radiator bypass valve 210, thereby effectively restricting the flow of engine coolant to the radiator 208 and/or substantially isolating the radiator 208 from the circulation of the engine coolant through the remainder of the engine coolant system 200. In one embodiment, the controller 214 can utilize sensed temperature information, as well as other information, such as a tachometer output and/or power setting to control the radiator bypass valve 210.

In one embodiment, the coolant system 200 can further aid the aero diesel engine member 102 in maintaining proper combustion in all realms of flight, including rapid power changes during a low-power descent, as well as re-ignition during high altitude restarts. In one embodiment, the engine coolant system 200 can be configured to utilize the one or more temperature sensors 206a-h to sense the temperature surrounding the cylinders 132 (or in proximity to the cylinders 132), and activate the radiator bypass valve 210 in order to restrict the flow of engine coolant to the radiator 208. For example, in one embodiment, the radiator bypass valve 210 can be activated when the temperature sensed by the one or more sensors 206a-h decreases below approximately 222° C., although other temperatures are also contemplated. For example, in one embodiment, the radiator bypass valve 210 can be activated to maintain the temperature of the engine coolant to between approximately 75 and 90° C., although other temperatures are also contemplated.

Accordingly, upon activation of the radiator bypass valve 210, the radiator 208 can be at least partially isolated from the coolant system 200, such that the heat within the coolant system 200 can be maintained. Heat maintained within the coolant system and circulated around the cylinders 132 via the water jackets 202 can aid the engine in maintaining the temperature of the cylinders 132 to facilitate combustion and/or ignition.

IV. Lubrication System

Figures 14, 14A:
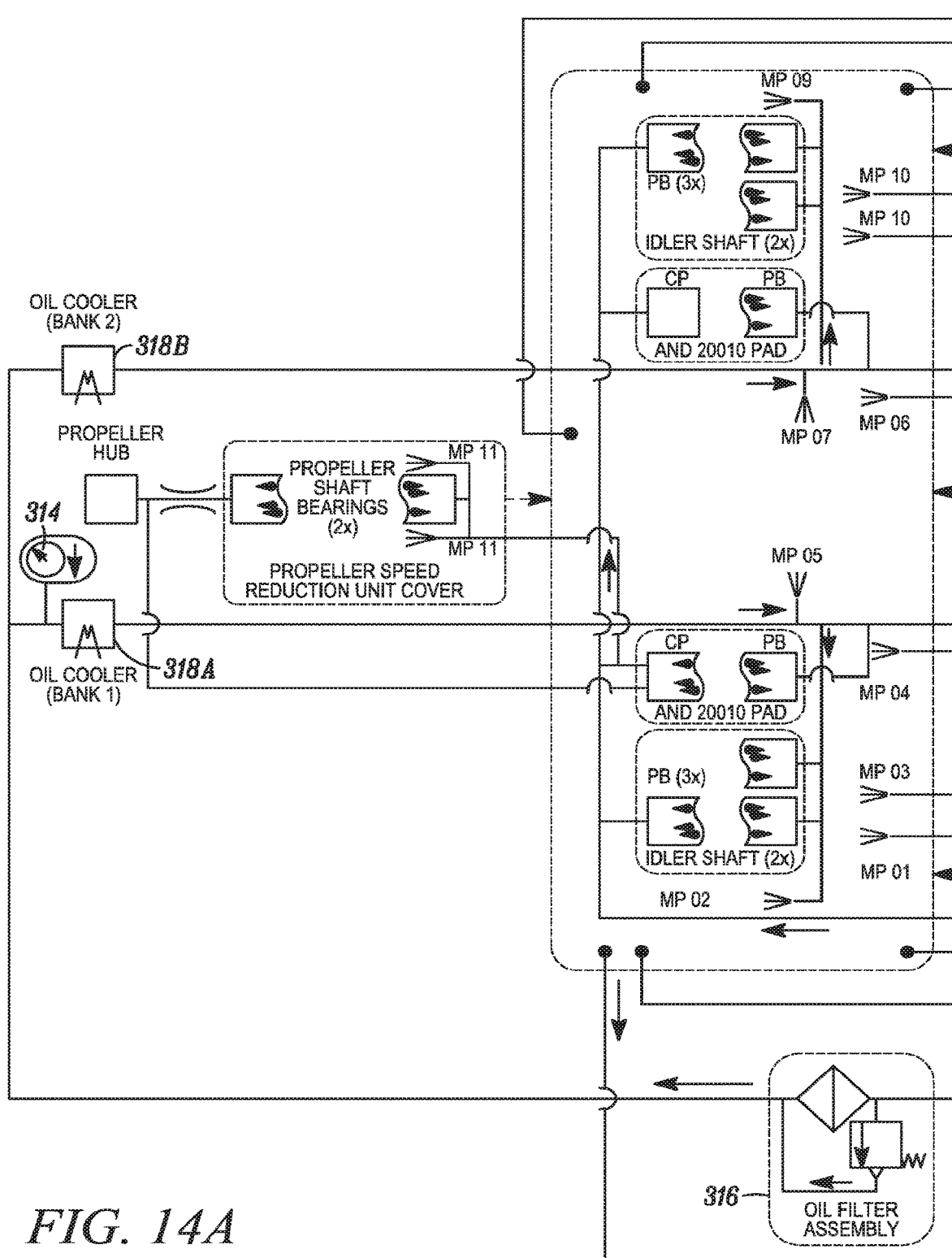
Figures 14, 14B:
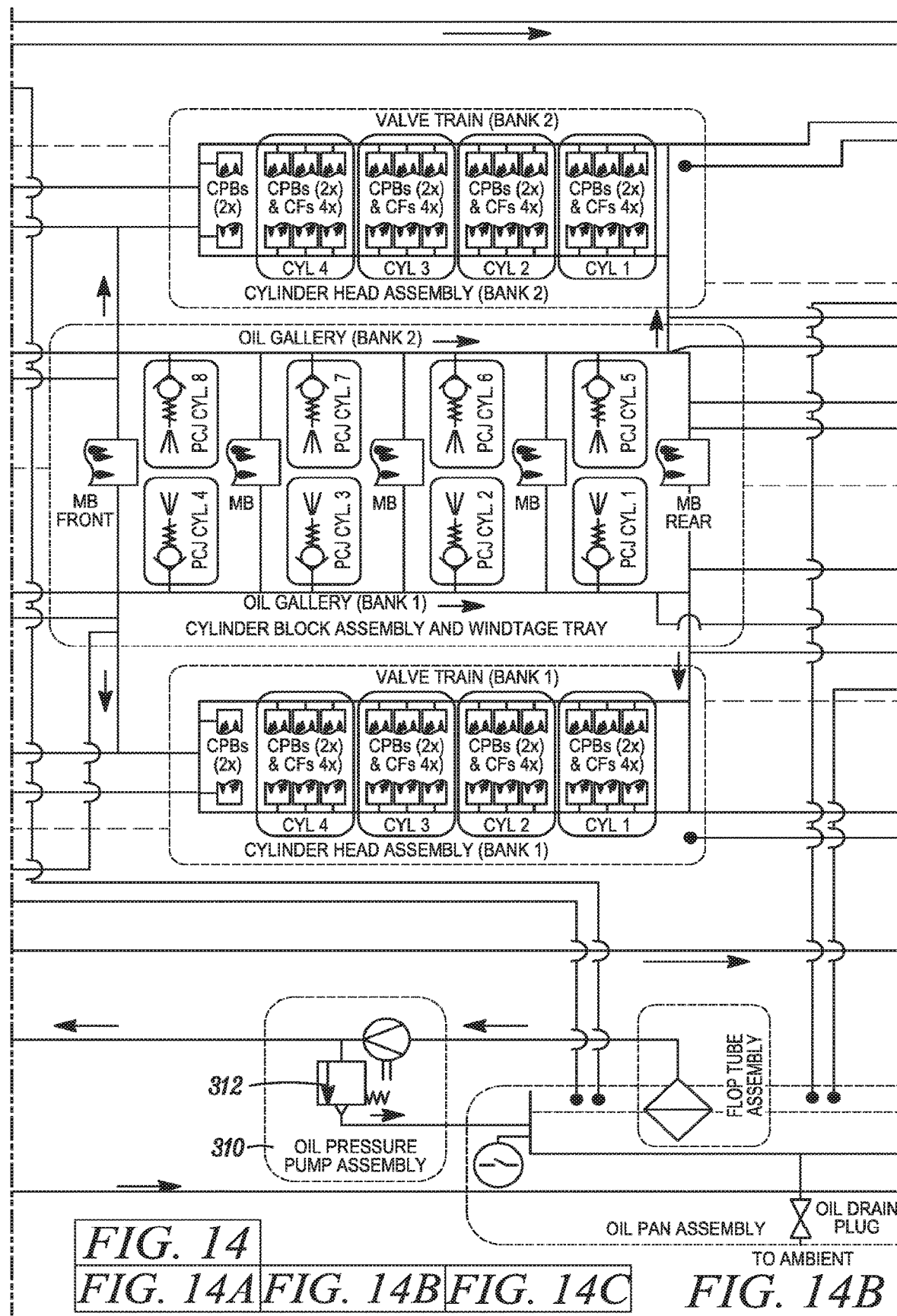

Referring to FIGS. 14A-C, a schematic view of an engine lubrication system 300 is depicted in accordance with an embodiment of the disclosure. The lubrication system 300 serves to remove process heat from hot components and inhibit mechanical wear on components exhibiting sliding motion to one another by providing a layer of lubricant between the surfaces. It ensures this not only by providing oil at pressures above ambient air pressure to critical components, but by also scavenging oil and air from common sump areas through suction and by ensuring proper ventilation of engine-internal areas.

The lubrication system 300 can be an integrated dry sump system configured to circulate lubricating oil through the aero diesel engine 102, so as to provide lubricating oil to at least the journal bearings 146 of the crankcase 122 and the first and second cylinder heads 160a-b. In one embodiment, the lubrication system 300 includes one or more scavenge pumps 302, a first centrifuge mechanism 304, a second centrifuge mechanism 306, an oil sump 308, a pressure pump 310, a pressure relief valve 312, one or more pressure sensors, an oil filter 316, one or more heat exchangers/oil coolers 318a-b, and conduit connecting the various components. In one embodiment, the conduit connecting the various components can be integrated into mechanical components serving additional functions.

The one or more scavenge pumps 302 can be configured to scavenge and/or recover oil from various locations within the engine member 102. The scavenged oil can be directed through scavenge line conduit to the first centrifuge mechanism 304. The first centrifuge mechanism 304 can be configured to separate entrained air and/or blow-by gases from the emulsified lubricating oil. After separation, the lubricating oil can be directed to the oil sump 308, while the gases can be directed to the second centrifuge mechanism 306. The second centrifuge mechanism 306 can be configured to further separate blow-by gases from any remaining lubricating oil. After the additional separation, the lubricating oil can be directed to the oil sump 308, while the blow-by gases can be vented to the atmosphere.

In one embodiment, the first centrifuge mechanism 304 includes a rotatable member configured to rotate within a housing, wherein the rotatable member and housing are configured to separate circulating lubricating oil from blow-by gas which has entered into the lubricating oil. After separation, the blow-by gas can flow into a second centrifuge mechanism 306. In one embodiment, the second centrifuge mechanism 306 includes a rotatable member configured to rotate within a housing, wherein the rotatable member and housing are configured to further separate aerosolized lubricating oil from the blow-by gas. After the second separation, the blow-by gas can exit the second centrifuge mechanism 306 and be exhausted into the atmosphere. In other embodiments, additional centrifuge mechanisms can be employed.

In one embodiment, the oil sump 308 is integrated into the engine oil pan 122, as opposed to an external oil tank. Integrating the oil sump 308 into the oil pan 122 enables the oil sump 308 to serve as a cover for the lower parts of the engine 102, which can provide structural reinforcement for the crank case 122 while providing a reservoir for lubricating oil. The scavenged, centrifuged oil is drawn from the oil sump 308 by pressure pump 310. The enables the pressure pump 310 generates oil pressure. The pressurized oil is then directed past the pressure relief valve 312. The pressurized oil will open the pressure relief valve 312 if the pressure exceeds a certain level, which will enable at least a portion of the pressurized lubricating oil to flow back to the oil sump 308, otherwise the pressurized oil will pass through the oil filter 316, passed a pressure sensor 314, and into heat exchangers 318a-b. Lubricating oil from the heat exchangers 318 a-b is then directed to the crankcase 122 and the respective cylinder heads 160a-b.

Accordingly, the first and second centrifuge mechanisms 304, 306 minimize oil aeration, and enable the journal bearings 146 and other bearing assemblies to operate without entrained air, which would otherwise reduce their load carrying capability. Furthermore, the use of multiple centrifuge mechanisms 304, 306 serves to minimize the loss of oil as blow-by gas is vented into the atmosphere, thereby reducing the quantity of oil lost through this process over the course of the flight.

V. Air-Fuel Charge Injection System

Figure 15:
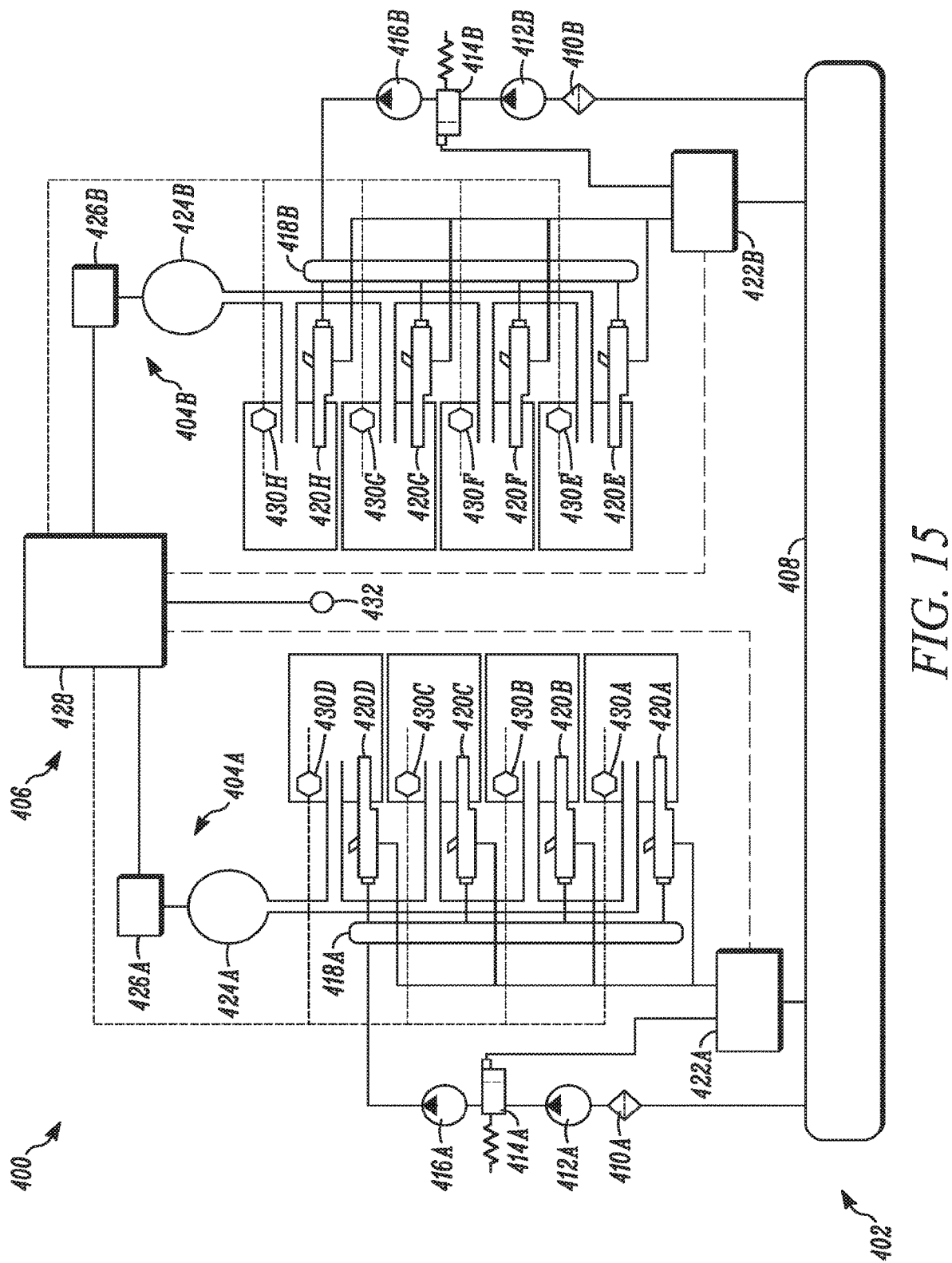
FIG. 15 is a schematic view depicting an air-fuel charge injection system in accordance with an embodiment of the disclosure.

Referring to FIG. 15, a schematic view of an air-fuel charge injection system 400 is depicted in accordance with an embodiment of the disclosure. The air-fuel charge injection system 400 can include a fuel injection subsystem 402, one or more turbocharger subsystem 404a/b, and Engine Electronic Control System (EECU) 406.

The fuel injection subsystem 402 can include a fuel tank 408, one or more fuel filters 410a/b, one or more low-pressure fuel pumps 412a/b, one or more fuel metering valves 414a/b, one or more high-pressure fuel pumps 416a/b, one or more fuel rails 418a/b, a plurality of fuel injectors 420a-h, and one or more injection control modules 422a/b. Within the fuel injection subsystem 402, fuel is drawn from a common fuel tank 408 by low-pressure pumps 412a/b through respective fuel filters 410a/b. The one or more injection control modules 422a/b electronically control respective fuel metering valves 414a/b. Although two injection control modules 422a/b are depicted, a single injection control module 422 may be employed having the combined functions of the two injection control modules 422a/b. Fuel is made available by the respective fuel metering valves 414a/b to the respective high-pressure fuel pumps 416a/b and thence to the respective fuel rails 418a/b and the plurality of fuel injectors 420a-d/420e-h of the respective first bank of cylinders 136a and the second bank of cylinders 136b.

In one embodiment, the engine member 102 is comprised of two four-cylinder engines that share a common crankshaft 124 and other engine ancillaries, but are able to operate independently of each other. In this embodiment, the engine coolant system 200 and the engine lubrication system 300 are advantageously shared by the two four-cylinder engines, but each of the two four-cylinder engines essentially operate independently of the other, whether the engine 102 is being operated with eight cylinders firing or with only two of the four cylinders firing. Accordingly, the injection control modules 422a/b are capable of shutting either of the two four-cylinder engine banks 136a/b down (or both simultaneously) by simply stopping fuel flow through the respective fuel metering valves 414a/b, or by not electrically pulsing the corresponding injectors 420 as desired.

The turbocharger subsystems 404a/b can include one or more turbochargers 424a/b, a turbocharger control module 426a/b, and ducting configured to enable turbocharged air to be directed into each of the cylinders 132 of the respective first and second bank of cylinders 136a/b. In one embodiment, the one or more turbochargers 424 a/b can be a dual stage turbocharger configured to naturally compensate for lower density air by speeding up with an increase in altitude. In one embodiment, the inlet air and/or fuel can be optionally routed through a coolant-air intake/fuel heat exchanger (not depicted) or oil air intake/fuel heat exchanger (not depicted) to preheat the air and/or fuel prior to entering the cylinders 132.

The EECU 406 can include a control system module 428, a plurality of combustion chamber pressure sensors 430a-h, and a crank speed sensor 432. The injection control modules 422a/b of the fuel injection subsystem 402 and the turbocharger control modules 426a/b of the turbocharger subsystems 404a/b can be in electrical communication with the control system module 428. In one embodiment, at least one combustion chamber pressure sensor 430a-h is positioned in or proximal to each cylinder 132a-h, and is configured to detect combustion pressure within the respective cylinder 132a-h. In one embodiment, the combustion chamber pressure sensors 430a-h can be in the form of a pressure sensing glow plug. The crank speed sensor 432 can be configured to measure the rotational speed and angle of the crankshaft 124 relative to the crank case 122. The combustion chamber pressure sensors 430a-h and the crank speed sensor 432 can be in electrical communication with the control system module 428, so as to enable data sensed by the combustion chamber pressure sensors 430a-h and the crank speed sensor 432 to be provided to the control system module 428.

In one embodiment, the EECU 406 is configured to alter the fuel injection by the fuel injection subsystem 402 and/or the supply of turbocharged air by the turbocharger subsystem 404a/b to adjust the timing and pressure of the combustion event within each of the cylinders 132a-h. In particular, the EECU 406 can be utilized to adjust the timing and/or duration of fuel injection as well as the output of the turbochargers 424a/b in real time to compensate for variances fuel and atmospheric conditions. For example, in one embodiment, the EECU 406 can be utilized to compensate for variances in the quantity or concentration of cetane in the diesel fuel.

Cetane is a quality and kerosene derivatives fuels that defines how rapidly combustion occurs in a diesel compression combustion engine. The high cetane number or level means that the fuel will begin to ignite rapidly and continue burning in a controlled fashion. Conversely, a low cetane number or level means that the fuel will ignite more slowly, and then cause a rapid pressure rise as the piston 128 approaches the top dead center (i.e., maximum compression). In other words, low cetane fuel has a longer ignition lag, but once ignition starts, the energy in the fuel rapidly combusts. Thus, low cetane fuel can be sensed by, a higher than normal peak cylinder pressure (Pmax), a longer than normal time for peak cylinder pressure (Pmax) to occur, and a higher than normal pressure rise per crank angle (dP/dt).

Additionally, the EECU 406 can be used to conduct a pressure check and/or calculate and Indicated Mean Effective Pressure (IMEP), or other performance criteria, of an aircraft prior to takeoff and in certain realms of flight. The combustion control system 406 can also be utilized as a predictive maintenance tool to determine abnormalities, such as degradation in at least one of the fuel injectors 420a-h, and warn the pilot of an impending failure and/or weak cylinder performance during flight. The EECU 406 can also be used to tune combustion and/or adjust individual contribution from the cylinders in a way that the resultant overall torque signal does not resonate with known system natural frequencies (e.g., natural frequencies of the engine 102, transmission 104 and propeller 106), thereby avoiding harmful harmonics that made damage the aero combustion drive assembly 100 components. Accordingly, in one embodiment, the EECU 406 enables the modification of the duration, timing, and peak cylinder pressure of the combustion event within each of the cylinders 132a-h, individually, and on a cylinder-by-cylinder basis.

Figure 16:
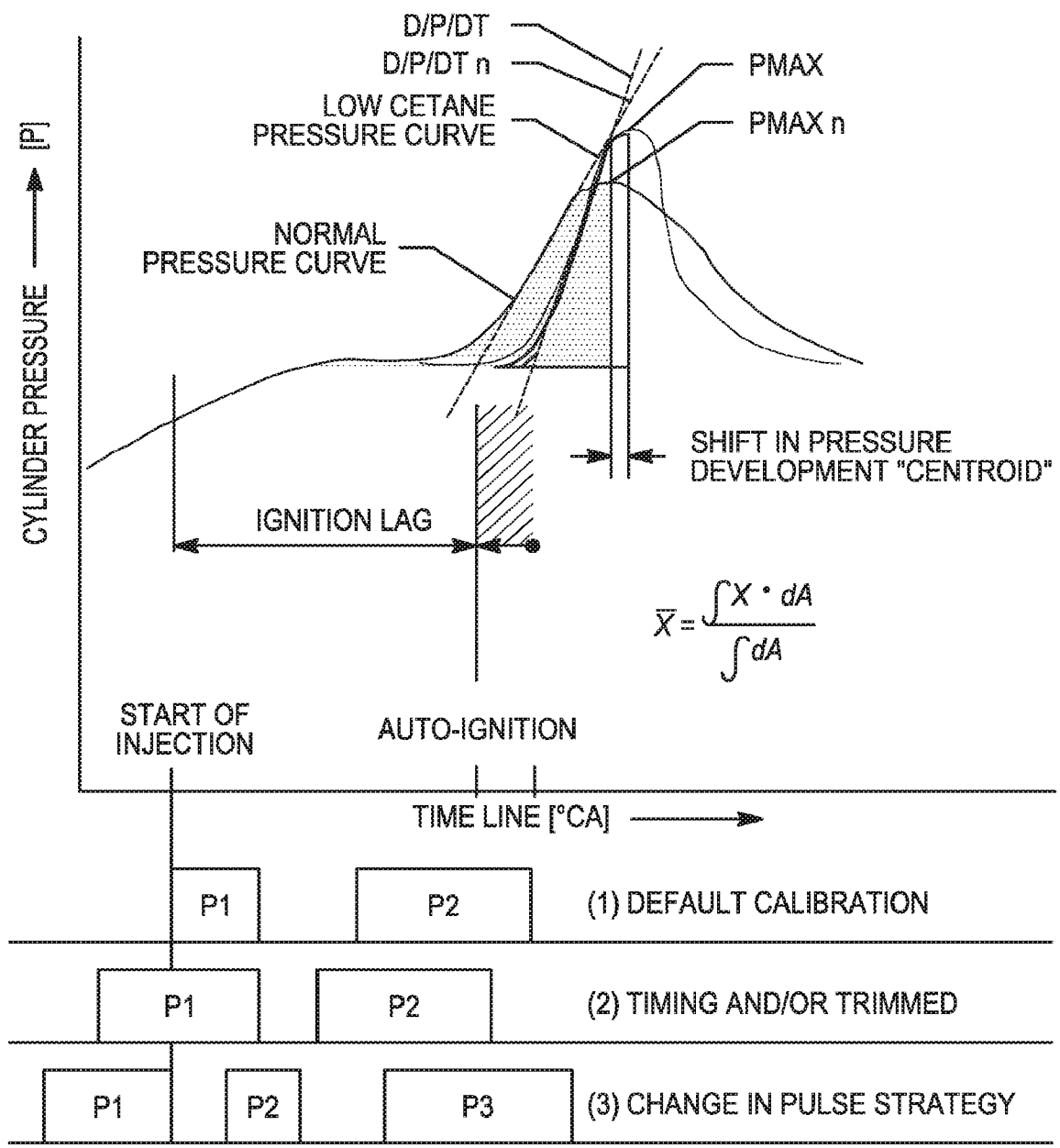
FIG. 16 is a graphical representation depicting a normal and actual rise in cylinder pressure during combustion in accordance with an embodiment of the disclosure.

Referring to FIG. 16 a graphical representation of a rise in cylinder pressure during combustion event is depicted in accordance with an embodiment of the disclosure. In this representation, the x-axis represents the cylinder pressure and the y-axis represents the timeline and/or crank angle of the crankshaft 124. The combustion chamber pressure sensors 430a-h and crank speed sensor 432 can be used to sense the pressure and respective crank angle (i.e. cylinder pressure against a time function) during the combustion event within each cylinder 132a-h. The data from the sensors 430, 432 can be communicated to the control system module 428 for processing. Within the control system module 428, the pressure function (i.e., the cylinder pressure over time or crank angle) can be integrated for evaluation of the point where combustion is effectively "centered," for the purpose of determining a control strategy for modifications that can be made, for example via injection timing, to place the peak cylinder pressure (Pmax) back in its usual location. Alternatively, the center of combustion can be determined by evaluating the pressure rise per crank angle (dP/dt) to determine the point where the dP/dt is effectively "zero," and using that point in time as the presumed center of combustion. Additionally, adjustments via a control strategy can be made depending on limits set for a maximum combustion pressure (Pmax) and a maximum pressure slope (dP/dt). Accordingly, the purpose of the control strategy and/or modifications developed and implemented by the EECU 406 is to adjust the combustion event through alteration of the injection of fuel (e.g., timing, duration, and/or number of pulses) and/or alteration of the turbocharger 424a/b speed, for the purpose of bringing the pressure curve within the threshold limits of what is considered to be "normal" or "preferred."

As depicted in FIG. 16, a normal combustion pressure curve is depicted, which includes a normal maximum cylinder pressure (Pmax n), a normal pressure slope or pressure rise per crank angle (dP/dt norm), and a normal center of combustion. Data relating to normal or expected combustion can be stored in control system 428 for comparison to actual measured conditions. FIG. 15 also depicts a low cetane combustion pressure curve, which includes a higher than normal peak cylinder pressure (Pmax), a higher than normal pressure rise per crank angle (dP/dt), and a longer than normal time for peak cylinder pressure to occur (i.e., a shift in the centroid of the pressure function).

As further depicted in FIG. 16, the default calibration of fuel injection for normal combustion can include two pulses of fuel injected into each cylinder 132 by the respective fuel injector 420 (respectively P1 and P2). If after comparison of the actual combustion pressure curve to the normal or expected combustion pressure curve reveals that there is a deviation in either the maximum cylinder pressure (4 Pmax), a deviation in the pressure slope (4 dP/dt), or a deviation in the centroid of the pressure function, the onset of the fuel injection during the first pulse (P1) can be advanced. If after further comparison, a deviation between the actual combustion pressure curve and the normal combustion pressure curve is observed, the timing and/or duration of the first pulse (P1) and second pulse (P2) can be altered, and a third pulse (P3) can be added. Accordingly, multiple injection pulses can be used to "round off" a rise in pressure, and/or reduce stress on downstream components of the aero combustion drive assembly 100. In one embodiment, an "after injection" pulse of fuel can be added to sustained turbo speed in low-power, high altitude operations. In other embodiments, a deviation between the actual and normal combustion pressure curve, for example a delay in the rise in cylinder pressure (dP/dt), can be interpreted as a lack of can be interpreted as a lack of air-fuel mixture, and can be compensated for by activating the secondary turbochargers of turbochargers 424a/b. In one embodiment, adjustments to the control strategy continue until the actual combustion pressure curve falls within a predefined bandwidth limit or tolerance when compared to the normal combustion pressure curve.

VI. Lightweight Gearing

Figures 17A, 17B:
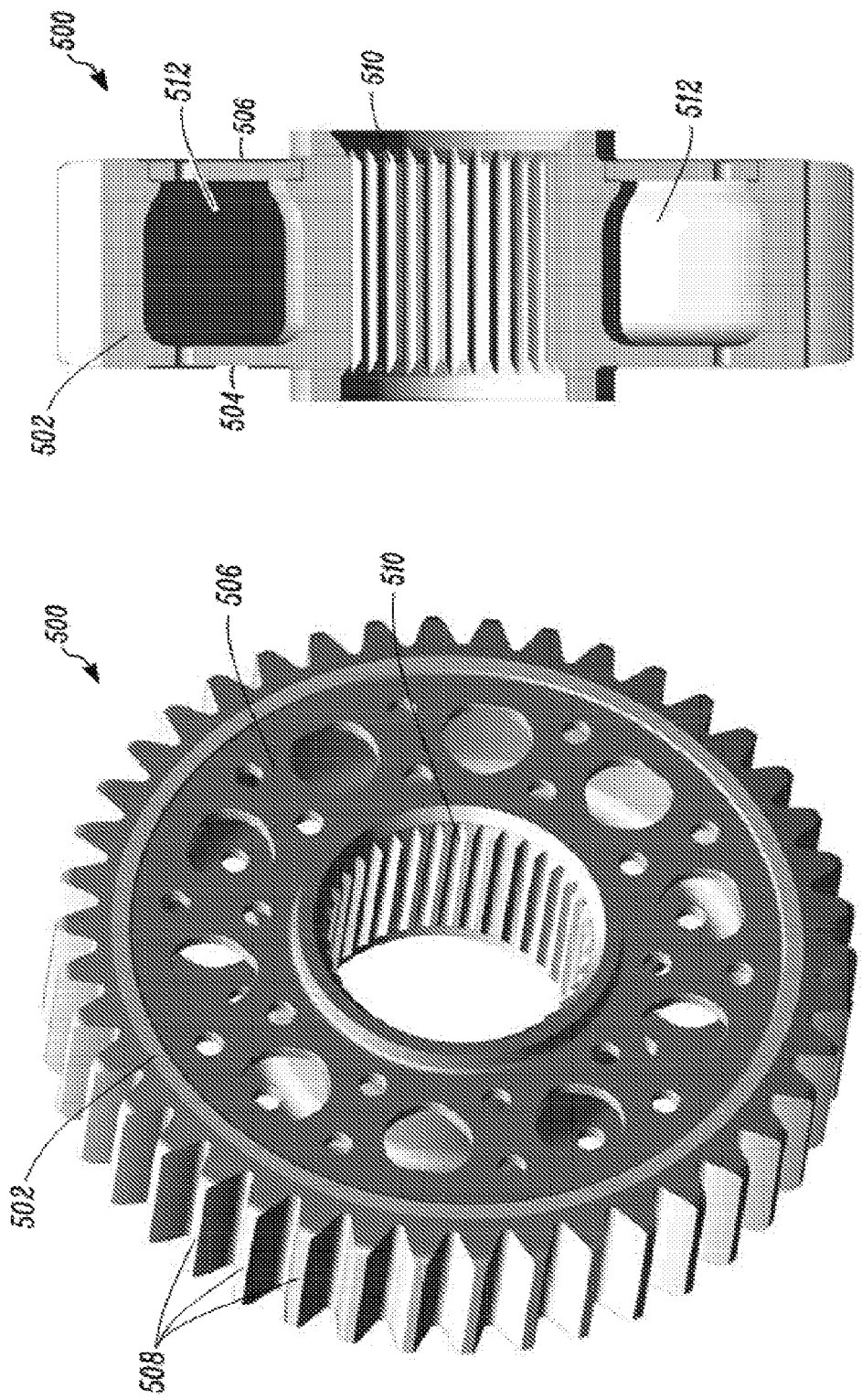
FIG. 17A is a perspective view depicting a lightweight gear in accordance with an embodiment of the disclosure.
FIG. 17B is a cross sectional view of the lightweight gear of FIG. 17A.

Referring to FIGS. 17A-B lightweight gear 500 is depicted in accordance with an embodiment of the disclosure. In one embodiment, the lightweight gear 500 can include an outer rim 502, integrated primary webbing 504, and an attached secondary webbing 506. The outer rim 502 can define a plurality of teeth 508 configured to mesh with other gears. The primary webbing 504 and/or the secondary webbing 506 can include an attachment portion 510 configured to be operably coupled to a rotatable shaft. In one embodiment, the outer rim 502 and primary webbing 504 are constructed of a unitary member, such that together the outer rim 502 and primary webbing form a dish-like structure, defining a hollow area 512, devoid of material.

Optionally, the secondary webbing 506 can be operably coupled to the outer rim 502 opposite the primary webbing 504, such that the hollow area 512 is positioned between the primary webbing 504 and the secondary webbing 506. For example, in one embodiment, the secondary webbing 506 can be welded to the outer rim 502.

In some embodiments of the aero diesel engine 102, the lightweight gear 500 can serve as one or more gears of the gearbox 104 and/or accessories 138. For example, in one embodiment, at least one of the opinion and/or maingear of the aero diesel engine 102 is a lightweight gear 500 having the above-described configuration.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A compact, lightweight ferritic aero diesel engine comprising:
    an iron crankcase having a flat, horizontally opposed eight cylinder arrangement, the iron crankcase defining a first set of cylinder walls defining four cylinders in a first bank and a second set of cylinder walls defining four cylinders in an opposed second bank;
    a steel crankshaft rotatably mounted at least partially within the iron crankcase;
    eight steel piston assemblies, each of the steel piston assemblies received within a respective cylinder of the iron crankcase and coupled to the steel crankshaft;
    an engine lubrication system having a first centrifuge mechanism configured to separate blow-by gases from lubricating oil, and a second centrifuge mechanism configured to further separate aerosolized lubricating oil from the blow-by gases;
    at least one lightweight gear having an outer rim and primary webbing constructed of a unitary member, such that together the outer rim and primary webbing form a dish-like structure defining a hollow area devoid of material; and
    wherein the at least one lightweight gear further includes secondary webbing coupled to the outer rim opposite the primary webbing, such that the hollow area is positioned between the primary webbing and the secondary webbing.

2. The ferritic aero diesel engine of claim 1, wherein the ferritic aero diesel engine with accessories weighs between approximately 595-680 lbs. (without operating fluids).

3. The ferritic aero diesel engine of claim 1, wherein the ferritic aero diesel engine is configured to produce between approximately 300-450 hp.

4. The ferritic aero diesel engine of claim 1, further comprising a first aluminum cylinder head and a second aluminum cylinder head, wherein the first aluminum cylinder head and the second aluminum cylinder head are operably coupled to the iron crankcase via a plurality of head bolts terminating proximal to a bottom portion of the respective cylinders.

5. The ferritic aero diesel engine of claim 1, wherein the crankcase includes diagonal ribs configured to improve a structural integrity of the crankcase.

6. The ferritic aero diesel engine of claim 1, further comprising one or more journal bearings, wherein the radial clearance of the one or more journal bearings is between approximately 35-55 μm.

7. The ferritic aero diesel engine of claim 1, wherein the piston assemblies are configured to withstand an infinite number of stress cycles having a peak stress of 300 MPa or less.

8. The ferritic aero diesel engine of claim 1, wherein the ferritic aero diesel engine is configured to operate with a peak cylinder pressure of up to 240 bar.

9. The ferritic aero diesel engine of claim 1, further comprising a coolant system, wherein adjacent cylinders of the ferritic aero diesel engine are spaced approximately 12 mm apart, and wherein the space between cylinder walls defines a water jacket between the adjacent cylinders though which engine coolant of the coolant system is circulated.

10. The ferritic aero diesel engine of claim 9, wherein the coolant system further a radiator and a radiator bypass valve, wherein the radiator bypass valve is configured to selectively isolate the radiator from the remainder of the coolant system.

11. The ferritic aero diesel engine of claim 10, wherein the radiator bypass valve is controlled via one or more temperature sensors configured to sense a temperature of the engine coolant surrounding the cylinders.

12. The ferritic aero diesel engine of claim 11, wherein the radiator bypass valve is activated when the temperature sensed by at least one of the one or more temperature sensors decreases below approximately 222° C.

13. The ferritic aero diesel engine of claim 1, wherein the first and second sets of cylinder walls have a minimum wall thickness of between approximately 4.8-5.2 mm.

14. A compact, lightweight ferritic aero diesel engine comprising:
an iron crankcase having a flat, horizontally opposed eight cylinder arrangement, the iron crankcase defining a first set of cylinder walls defining four cylinders in a first bank and a second set of cylinder walls defining four cylinders in an opposed second bank;
a steel crankshaft rotatably mounted at least partially within the iron crankcase;
eight steel piston assemblies, each of the steel piston assemblies received within a respective cylinder of the iron crankcase and coupled to the steel crankshaft;
a coolant system, wherein adjacent cylinders of the ferritic aero diesel engine are spaced apart, and wherein the space between cylinder walls defines a water jacket between the adjacent cylinders through which engine coolant of the coolant system is circulated to maintain the temperature of the cylinders by retaining heat to facilitate compression combustion of the engine and avoid freezing of combustion during low-power descents; and
an engine lubrication system having a first centrifuge mechanism configured to separate blow-by gases from lubricating oil, and a second centrifuge mechanism configured to further separate aerosolized lubricating oil from the blow-by gases.

15. A compact, lightweight ferritic aero diesel engine comprising:
an iron crankcase having a flat, horizontally opposed eight cylinder arrangement, the iron crankcase defining a first set of cylinder walls defining four cylinders in a first bank and a second set of cylinder walls defining four cylinders in an opposed second bank;
a steel crankshaft rotatably mounted at least partially within the iron crankcase;
eight steel piston assemblies, each of the steel piston assemblies received within a respective cylinder of the iron crankcase and coupled to the steel crankshaft;
a coolant system, wherein adjacent cylinders of the ferritic aero diesel engine are spaced approximately 12 mm apart, and wherein the space between cylinder walls defines a water jacket between the adjacent cylinders though which engine coolant of the coolant system is circulated; and
an engine lubrication system having a first centrifuge mechanism configured to separate blow-by gases from lubricating oil, and a second centrifuge mechanism configured to further separate aerosolized lubricating oil from the blow-by gases.

16. The ferritic aero diesel engine of claim 15, further comprising at least one lightweight gear having an outer rim and primary webbing constructed of a unitary member, such that together the outer rim and primary webbing form a dish-like structure defining a hollow area devoid of material.

17. The ferritic aero diesel engine of claim 16, wherein the at least one lightweight gear further includes secondary webbing coupled to the outer rim opposite the primary webbing, such that the hollow area is positioned between the primary webbing and the secondary webbing.

* * * * *

UNITED STATES PATENT AND TRADEMARK OFFICE
CERTIFICATE OF CORRECTION

PATENT NO. : 11,428,157 B2
APPLICATION NO. : 16/632783
DATED : August 30, 2022
INVENTOR(S) : Michael J. Fuchs It is certified that error appears in the above-identified patent and that said Letters Patent is hereby corrected as shown below:

In the Drawings

Sheet 17 of 21 (FIG. 14B), Line 10 (approx.), delete "WINDTAGE" and insert -- WINDAGE --.

In the Specification

Column 7, Line 59, delete "Brinnell" and insert -- Brinell --.

Column 8, Line 28 (approx.), delete "Brinnell" and insert -- Brinell --.

Column 10, Line 38, delete "ferretic" and insert -- ferritic --.

Column 10, Line 38, delete "ferretic" and insert -- ferritic --.

In the Claims

Column 20, Line 64, Claim 9, delete "though" and insert -- through --.

Column 20, Line 67, Claim 10, delete "system further a" and insert -- system further comprises a --.

Column 22, Line 20 (approx.), Claim 15, delete "though" and insert -- through --.

Signed and Sealed this
Tenth Day of January, 2023

Katherine Kelly Vidal
*Director of the United States Patent and Trademark Office*